United States Patent
Oba et al.

(10) Patent No.: US 8,056,659 B2
(45) Date of Patent: Nov. 15, 2011

(54) POWER OUTPUT APPARATUS AND HYBRID VEHICLE

(75) Inventors: Hidehiro Oba, Aichi-ken (JP); Yukihiko Ideshio, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 261 days.

(21) Appl. No.: 12/445,321

(22) PCT Filed: Oct. 19, 2007

(86) PCT No.: PCT/JP2007/070439
§ 371 (c)(1),
(2), (4) Date: Apr. 13, 2009

(87) PCT Pub. No.: WO2008/050684
PCT Pub. Date: May 2, 2008

(65) Prior Publication Data
US 2010/0044128 A1     Feb. 25, 2010

(30) Foreign Application Priority Data

Oct. 24, 2006     (JP) .................................. 2006-288667

(51) Int. Cl.
*B60K 6/44* (2007.10)
*B60K 6/46* (2007.10)
*B60K 6/48* (2007.10)

(52) U.S. Cl. ............. 180/65.225; 180/65.23; 180/65.25; 180/65.6; 180/65.7; 477/5; 475/5

(58) Field of Classification Search ............... 180/65.21, 180/65.225, 65.23, 65.235, 65.24, 65.245, 180/65.25, 65.6, 65.7, 65.8, 292, 293; 477/5, 477/6, 8; 475/5
See application file for complete search history.

(56) References Cited

U.S. PATENT DOCUMENTS

| | | | | |
|---|---|---|---|---|
| 5,513,719 A | * | 5/1996 | Moroto et al. | 180/65.21 |
| 5,669,842 A | | 9/1997 | Schmidt | |
| 5,991,683 A | * | 11/1999 | Takaoka et al. | 701/102 |
| 6,048,289 A | * | 4/2000 | Hattori et al. | 477/15 |
| 6,131,680 A | * | 10/2000 | Nii et al. | 180/65.235 |
| 6,155,364 A | * | 12/2000 | Nagano et al. | 180/65.235 |
| 6,520,879 B2 | * | 2/2003 | Kawabata et al. | 475/5 |
| 6,551,208 B1 | * | 4/2003 | Holmes et al. | 475/5 |
| 6,656,082 B1 | * | 12/2003 | Yamada et al. | 477/5 |
| 6,808,470 B2 | * | 10/2004 | Boll | 477/6 |

(Continued)

FOREIGN PATENT DOCUMENTS

JP     2003-106389 A     4/2003

(Continued)

*Primary Examiner* — Faye M. Fleming
*Assistant Examiner* — George D. Spisich
(74) *Attorney, Agent, or Firm* — Kenyon & Kenyon LLP

(57) ABSTRACT

The hybrid vehicle includes an engine, two motors, and a power distribution integration mechanism arranged coaxially with one another and a transmission. The transmission includes a transmission shaft extended in parallel with a first motor shaft and a second motor shaft, a first coupling gear train in combination with a second coupling gear train and a clutch arranged to selectively connect a ring gear and a sun gear of the power distribution integration mechanism to the transmission shaft, a deceleration mechanism connected with the transmission shaft and arranged to decelerate power from the transmission shaft and output the power of the reduced speed from a carrier, and a clutch arranged to selectively connect the carrier and the ring gear to a driveshaft.

13 Claims, 11 Drawing Sheets

U.S. PATENT DOCUMENTS

| | | | |
|---|---|---|---|
| 6,966,866 B2 * | 11/2005 | Ando et al. | 477/4 |
| 7,264,071 B2 * | 9/2007 | Schmidt et al. | 180/65.6 |
| 7,523,797 B2 * | 4/2009 | Kimura et al. | 180/65.25 |
| 7,597,165 B2 * | 10/2009 | Kaneko et al. | 180/65.6 |
| 7,610,974 B2 * | 11/2009 | Abe | 180/65.21 |
| 2002/0189397 A1 * | 12/2002 | Sakamoto et al. | 74/661 |
| 2004/0251064 A1 * | 12/2004 | Imai | 180/65.2 |
| 2005/0178594 A1 * | 8/2005 | Yamauchi et al. | 180/65.2 |

FOREIGN PATENT DOCUMENTS

| | | |
|---|---|---|
| JP | 2005-125876 A | 5/2005 |
| JP | 2005-155891 A | 6/2005 |

* cited by examiner

FIG. 8

| | Speed Change State | Clutch C1 | Clutch C2 | Clutch C0 |
|---|---|---|---|---|
| Engine Operation Drive Mode | 1st Speed | R | R | M |
| | 1st Speed-2nd Speed Simultaneous Engagement | M | R | M |
| | 2nd Speed | L | R | M |
| | 2nd Speed-3rd Speed Simultaneous Engagement | L | M | M |
| | 3rd Speed | L | L | M |
| | 3rd Speed Fixation | L | L | L |
| Motor Drive Mode | 1st Speed | R | R | M or R |
| | 1st Speed-2nd Speed Simultaneous Engagement | M | R | M |
| | 2nd Speed | L | R | M or R |
| | 2nd Speed-3rd Speed Simultaneous Engagement | L | M | M |
| | 3rd Speed | L | L | M or R |

FIG. 14

| | Speed Change State | C1a | C1b | C2a | C2b | C0' | B0 |
|---|---|---|---|---|---|---|---|
| Engine Operation Drive Mode | 1st Speed | ○ | × | ○ | × | ○ | × |
| | 1st Speed–2nd Speed Simultaneous Engagement | ○ | ○ | ○ | × | ○ | × |
| | 2nd Speed | × | ○ | ○ | × | ○ | × |
| | 2nd Speed–3rd Speed Simultaneous Engagement | × | ○ | ○ | ○ | ○ | × |
| | 3rd Speed | × | ○or× | × | ○ | ○ | × |
| | 3rd Speed Fixation | × | ○or× | × | ○ | ○ | ○ |
| Motor Drive Mode | 1st Speed | ○ | × | ○ | × | ○or× | × |
| | 1st Speed–2nd Speed Simultaneous Engagement | ○ | ○ | ○ | × | ○ | × |
| | 2nd Speed | × | ○ | ○ | × | ○or× | × |
| | 2nd Speed–3rd Speed Simultaneous Engagement | × | ○ | ○ | ○ | ○ | × |
| | 3rd Speed | × | ○or× | × | ○ | ○or× | × |

(Where the symbol 'o' represents performing connection and the symbol 'x' represents releasing connection.)

POWER OUTPUT APPARATUS AND HYBRID VEHICLE

This is a 371 national phase application of PCT/JP2007/070439 filed 19 Oct. 2007, claiming priority to Japanese Patent Application No. JP 2006-288667 filed 24 Oct. 2006, the contents of which are incorporated herein by reference.

TECHNICAL FIELD

The present invention relates to a power output apparatus configured to output power to a driveshaft, as well as to a hybrid vehicle equipped with such a power output apparatus.

BACKGROUND ART

One proposed structure of the power output apparatus includes an internal combustion engine, two motors, a Ravigneaux planetary gear mechanism, and a parallel shaft-type transmission arranged to selectively connect two output elements of the planetary gear mechanism to an output shaft (see, for example, Patent Document 1). Another proposed structure of the power output apparatus has a planetary gear mechanism including an input element connected with an internal combustion engine and two output elements, and a parallel shaft-type transmission including a countershaft connected with the respective output elements of the planetary gear mechanism (see, for example, Patent Document 2). In the power output apparatus of this proposed structure, the two output elements of the planetary gear mechanism are respectively fixed to the inner circumferences of corresponding rotors in an electric driving system. A conventionally known structure of the power output apparatus has a power distribution mechanism including an input element connected with an internal combustion engine, a reactive force element connected with a first motor generator, and an output element connected with a second motor generator, and two clutches arranged to selectively connect an axle as an output member to the output element or the reactive force element of the power distribution mechanism (see, for example, Patent Document 3). In the power output apparatus of this conventional structure, when the first motor generator is rotated at a negative rotation speed to perform power operation, the two clutches are controlled to connect the reactive force element of the power distribution mechanism to the output member and disconnect the output element of the power distribution mechanism from the output member. Such control prevents the occurrence of power circulation where the first motor generator is driven with electric power generated by the second motor generator that uses part of the power of the output member.

Patent Document 1: Japanese Patent Laid-Open No. 2005-155891
Patent Document 2: Japanese Patent Laid-Open No. 2003-106389
Patent Document 3: Japanese Patent Laid-Open No. 2005-125876

DISCLOSURE OF THE INVENTION

In application of the power output apparatus of the prior art structure, it is required to enhance the power transmission efficiency in a wider driving range. The prior art power output apparatuses thus still have some room for improvement. The power output apparatus disclosed in Patent Document 1 cited above is designed to be mounted on a front wheel-drive vehicle. In this prior art power output apparatus including the parallel shaft-type transmission, the arrangement of the two motors across multiple drive gears included in the parallel shaft-type transmission undesirably increases the dimension of the power output apparatus in its width direction (that is, the dimension in an axial direction of the parallel shaft-type transmission). In the power output apparatus disclosed in Patent Document 1, the two motors, the horizontally laid internal combustion engine and planetary gear mechanism, and the parallel shaft-type transmission are extended in parallel with one another. The power output apparatus of this structure occupies a relatively large space and is thus not suitably mounted on a vehicle. The power output apparatus disclosed in Patent Document 2 cited above is designed to be mounted on a rear wheel-drive vehicle. There is thus difficulty in applying the power output apparatus of this structure to a front wheel-drive vehicle.

There would thus be a demand for providing a power output apparatus having the improved power transmission efficiency in a wider driving range, as well as a hybrid vehicle equipped with such a power output apparatus. There would also be a demand for providing a space-saving power output apparatus to be suitably mounted on a vehicle, especially a front-wheel driven-based vehicle, as well as a hybrid vehicle equipped with such a power output apparatus.

The present invention accomplishes at least part of the demands mentioned above and the other relevant demands by the following configurations applied to the power output apparatus and to the hybrid vehicle.

According to one aspect, the invention is directed to a power output apparatus configured to output power to a driveshaft. The power output apparatus includes: an internal combustion engine; a first motor constructed to input and output power; a second motor constructed to input and output power; a power distribution integration mechanism configured to have a first element connecting with a rotating shaft of the first motor, a second element connecting with a rotating shaft of the second motor, and a third element connecting with an engine shaft of the internal combustion engine and arranged to allow mutually differential rotations of the three elements; and a speed change-transmission assembly constructed to include a transmission shaft, a first connection device arranged to selectively connect the first element and the second element of the power distribution integration mechanism to the transmission shaft, a speed change mechanism having an output element and an input element connected to the transmission shaft and configured to change speed of power from the transmission shaft at a preset speed ratio and output the power of the changed speed from the output element, and a second connection device arranged to selectively connect the output element of the speed change mechanism and at least one of the first element and the second element of the power distribution integration mechanism to the driveshaft.

The power output apparatus according to this aspect of the invention has the speed change-transmission assembly including: the transmission shaft; the first connection device arranged to selectively connect the first element and the second element of the power distribution integration mechanism to the transmission shaft; the speed change mechanism arranged to include the output element and the input element connected to the transmission shaft and configured to change speed of power from the transmission shaft at the preset speed ratio and output the power of the changed speed from the output element; and the second connection device arranged to selectively connect the output element of the speed change mechanism and at least one of the first element and the second element of the power distribution integration mechanism to the driveshaft. In the power output apparatus of this configuration, in the state of connecting either one of the first element and the second element of the power distribution integration mechanism to the transmission shaft by means of the first connection device of the speed change-transmission assembly, the connection of the output element of the speed change mechanism to the driveshaft by means of the second connection device enables the power from either the first element or the second element of the power distribution integration mechanism to be subjected to speed change by the speed change mechanism and output to the driveshaft. The connection of at least one of the first element and the second element of the power distribution integration mechanism to the driveshaft by means of the second connection device of the speed change-transmission assembly enables the power from either the first element or the second element of the power distribution integration mechanism to be directly output to the driveshaft. The speed change-transmission assembly of this structure thus enables the power from the power distribution integration mechanism to be subjected to speed change at multiple different stages and output to the driveshaft. In the power output apparatus of this configuration, in the state of connecting the first element of the power distribution integration mechanism to the transmission shaft by means of the first connection device of the speed change-transmission assembly or to the driveshaft by means of the second connection device of the speed change-transmission assembly, the first motor connecting with the first element or an output element of the power distribution integration mechanism functions as a motor, while the second motor connecting with the second element or a reaction force element of the power distribution integration mechanism functions as a generator. In the state of connecting the second element of the power distribution integration mechanism to the transmission shaft by means of the first connection device of the speed change-transmission assembly or to the driveshaft by means of the second connection device of the speed change-transmission assembly, on the other hand, the second motor connecting with the second element or an output element of the power distribution integration mechanism functions as a motor, while the first motor connecting with the first element or a reaction force element of the power distribution integration mechanism function as a generator. Adequate changeover of the connection state by means of the first connection device and the second connection device effectively prevents the rotation speed of one of the first motor and the second motor functioning as a generator from decreasing to a negative value with an increase of the rotation speed of the other of the first motor and the second motor functioning as a motor. The configuration of the power output apparatus effectively prevents the occurrence of power circulation, thus improving the power transmission efficiency in a wider driving range.

In one preferable application of the power output apparatus according to the above aspect of the invention, the transmission shaft of the speed change-transmission assembly is extended substantially in parallel with the rotating shaft of the first motor and with the rotating shaft of the second motor. The first motor and the second motor may be arranged substantially coaxially with the internal combustion engine. The power distribution integration mechanism may be located between the first motor and the second motor, and arranged substantially coaxially with the first motor and the second motor. The speed change-transmission assembly includes the transmission shaft extended substantially in parallel with the rotating shaft of the first motor and with the rotating shaft of the second motor. The arrangement of the first connection device, the second connection device, and the speed change mechanism coaxial with and around the transmission shaft allows a biaxial structure of the power output apparatus. The substantially coaxial arrangement of the internal combustion engine, the first motor, the second motor, and the power distribution integration mechanism thus does not significantly increase the dimension of the power output apparatus in its axial direction (that is, the dimension in the width direction). The power output apparatus of this arrangement is accordingly space-saving to be suitably mounted on a vehicle and is extremely preferable for a front-wheel drive-based vehicle.

In another preferable application of the power output apparatus according to the above aspect of the invention, the first connection device of the speed change-transmission assembly includes a first parallel shaft-type gear train connected to the first element, a second parallel shaft-type gear train connected to the second element, and a changeover unit arranged to selectively change over a connection state between a first element connection state of connecting the first parallel shaft-type gear train to the transmission shaft and a second element connection state of connecting the second parallel shaft-type gear train to the transmission shaft. The first connection device of the speed change-transmission assembly has the two sets of parallel shaft-type gear trains and the changeover unit. This arrangement enables the first element and the second element of the power distribution integration mechanism to be selectively connected to the transmission shaft, while preventing a significant increase in dimension of the first connection device in the axial direction of the transmission shaft. The connection of either the first element or the second element of the power distribution integration mechanism to the transmission shaft via the parallel shaft-type gear train allows the speed ratio between the first element or the second element and the transmission shaft to be freely set.

In one preferable embodiment of the power output apparatus of the above application, the changeover unit of the first connection device is arranged to selectively change over the connection state among the first element connection state, the second element connection state, and a both elements connection state of connecting both of the first parallel shaft-type gear train and the second parallel shaft-type gear train to the transmission shaft. The both elements connection state selectively sets by the changeover unit enables power from the internal combustion engine to be mechanically (directly) transmitted to the driveshaft at a fixed speed ratio. The power output apparatus of this arrangement thus favorably improves the power transmission efficiency in the wider driving range.

In still another preferable application of the power output apparatus according to the above aspect of the invention, the second connection device of the speed change-transmission assembly is constructed to selectively change over a connection state among a speed change mechanism-driveshaft connection state of connecting the output element of the speed change mechanism to the driveshaft, a direct connection state of connecting either one of the first element and the second element of the power distribution integration mechanism to the driveshaft, and a simultaneous connection state of connecting the output element of the speed change mechanism and either one of the first element and the second element of the power distribution integration mechanism to the driveshaft. The simultaneous connection state selectively sets by the second connection device also enables power from the internal combustion engine to be mechanically (directly) transmitted to the driveshaft at a fixed speed ratio. The power output apparatus of this arrangement thus favorably improves the power transmission efficiency in the wider driving range.

In one preferable embodiment of the invention, the power output apparatus according to the above aspect of the invention further has a fixation device configured to fix either one of the rotating shaft of the first motor and the rotating shaft of the second motor in a non-rotatable manner. In the state of connection of the first element or the second element of the power distribution integration mechanism, which connects with the first motor or the second motor having the rotating shaft that is not fixed by the fixation device, with the transmission shaft or with the driveshaft by means of the first connection device or the second connection device of the speed change-transmission assembly, the fixation of the rotating shaft of the second motor or the rotating shaft of the first motor in a non-rotatable manner by means of the fixation device also enables power from the internal combustion engine to be mechanically (directly) transmitted to the driveshaft at a fixed speed ratio. The power output apparatus of this arrangement thus favorably improves the power transmission efficiency in the wider driving range.

In another preferable embodiment of the invention, the power output apparatus according to the above aspect of the invention further has a connecting-disconnecting device that is arranged to perform any of a connection and a release of the connection of the first motor with the first element, a connection and a release of the connection of the second motor with the second element, and a connection and a release of the connection of the internal combustion engine with the third element. In the power output apparatus equipped with the connecting-disconnecting device, the release of the connection by the connecting-disconnecting device enables the internal combustion engine to be substantially separated from the first motor, the second motor, and the speed change-transmission assembly by the function of the power distribution integration mechanism. In the power output apparatus of this embodiment, the release of the connection by the connecting-disconnecting device in combination with an operation stop of the internal combustion engine enables power from at least one of the first motor and the second motor to be efficiently transmitted to the driveshaft with a change of the speed change state (speed ratio) set in the speed change-transmission assembly. The power output apparatus of this arrangement desirably lowers the maximum torques required for the first motor and the second motor, thus ensuring size reduction of the first motor and the second motor.

In one preferable embodiment of the power output apparatus of the invention, the speed change mechanism of the speed change-transmission assembly may be a deceleration mechanism configured to decelerate power input from the transmission shaft into the input element at a preset speed reduction ratio and output the power of the reduced speed from the output element. In another preferable embodiment of the power output apparatus of the invention, the speed change mechanism of the speed change-transmission assembly may be a three element-type planetary gear mechanism. These arrangements ensure size reduction of the speed change-transmission assembly.

In one preferable application of the power output apparatus according to the above aspect of the invention, one of the first element and the second element of the power distribution integration mechanism is specified to receive a greater torque from the third element connected to the engine shaft and is connected to either the first motor or the second motor through a deceleration device configured to reduce a rotation speed of the rotating shaft of the first motor or the second motor. One of the first element and the second element of the power distribution integration mechanism having the greater torque distribution fraction from the internal combustion engine is connected to the first motor or to the second motor through the deceleration device. This arrangement effectively reduces the torque load of the first motor or the second motor connecting with the deceleration device, thus desirably ensuring size reduction and power loss reduction of the first motor or the second motor connecting with the deceleration device.

In one preferable embodiment of the power output apparatus of this application, the power distribution integration mechanism is a single-pinion planetary gear mechanism including a sun gear, a ring gear, and a carrier arranged to hold at least one pinion gear engaging with both the sun gear and the ring gear, the first element being one of the sun gear and the ring gear, the second element being the other of the sun gear and the ring gear, and the third element being the carrier. The deceleration device may be constructed to have a speed reduction ratio close to a value $\rho$, and located between the first motor or the second motor and the ring gear, where $\rho$ represents a gear ratio of the power distribution integration mechanism given as a ratio of number of teeth of the sun gear to number of teeth of the ring gear. In the power distribution integration mechanism of such specification, the ring gear has the greater torque distribution fraction from the internal combustion engine, compared with the sun gear. The arrangement of the deceleration device between the ring gear and the first motor or the second motor desirably ensures size reduction and power loss reduction of the first motor or the second motor. In this arrangement, setting the speed reduction ratio of the deceleration device close to the value $\rho$ enables the first motor and the second motor to have substantially identical specifications. Such setting effectively improves the productivity of the power output apparatus and reduces the manufacturing cost of the power output apparatus.

In another preferable embodiment of the power output apparatus of the above application, the power distribution integration mechanism is a double-pinion planetary gear mechanism including a sun gear, a ring gear, and a carrier arranged to hold at least one set of two pinion gears engaging with each other and respectively engaging with the sun gear and with the ring gear, the first element being one of the sun gear and the carrier, the second element being the other of the sun gear and the carrier, and the third element being the ring gear. In the power output apparatus of this embodiment, for example, the power distribution integration mechanism as the double-pinion planetary gear mechanism may be constructed to have a gear ratio $\rho$ satisfying a relation of $\rho<0.5$, where the gear ratio $\rho$ represents a ratio of number of teeth of the sun gear to number of teeth of the ring gear. The deceleration device may be constructed to have a speed reduction ratio close to $\rho/(1-\rho)$ and is located between the first motor or the second motor and the carrier. In the power distribution integration mechanism of such specification, the carrier has the greater torque distribution fraction from the internal combustion engine, compared with the sun gear. The arrangement of the deceleration device between the carrier and the first motor or the second motor desirably ensures size reduction and power loss reduction of the first motor or the second motor. Setting the speed reduction ratio of the deceleration device close to the value $\rho/(1-\rho)$ enables the first motor and the second motor to have substantially identical specifications. This arrangement effectively improves the productivity of the power output apparatus and reduces the manufacturing cost of the power output apparatus. In another example, the power distribution integration mechanism as the double-pinion planetary gear mechanism may be constructed to have a gear ratio $\rho$ satisfying a relation of $\rho>0.5$, where the gear ratio $\rho$ represents a ratio of number of teeth of the sun gear to number of teeth of the ring gear. The deceleration device may be constructed to have a speed reduction ratio close to $(1-\rho)/\rho$ and is located between the first motor or the second motor and the sun gear.

According to another aspect, the invention is also directed to a hybrid vehicle equipped with the power output apparatus having any of the arrangements discussed above and with drive wheels that are driven by power from the driveshaft. The power output apparatus mounted on the hybrid vehicle has the improved power transmission efficiency in the wider driving range as discussed above. The hybrid vehicle with the power output apparatus accordingly has the improved fuel consumption and the favorable driving performance.

BRIEF DESCRIPTION OF THE DRAWINGS

FIG. 8 is a table showing combinations of the clutch position of a clutch C0 and the clutch positions of clutches C1 and C2 included in the transmission 90 during drive of the hybrid vehicle 20 of the embodiment;

FIG. 14 is a table showing combinations of the clutch position of a clutch C0', the brake position of a brake B0, and the clutch positions of clutches C1a, C1b, C2a, and C2b included in a transmission 90B during drive of the hybrid vehicle 20B of the modified example.

BEST MODES OF CARRYING OUT THE INVENTION

Some modes of carrying out the invention are described below as preferred embodiments.

Figure 1:
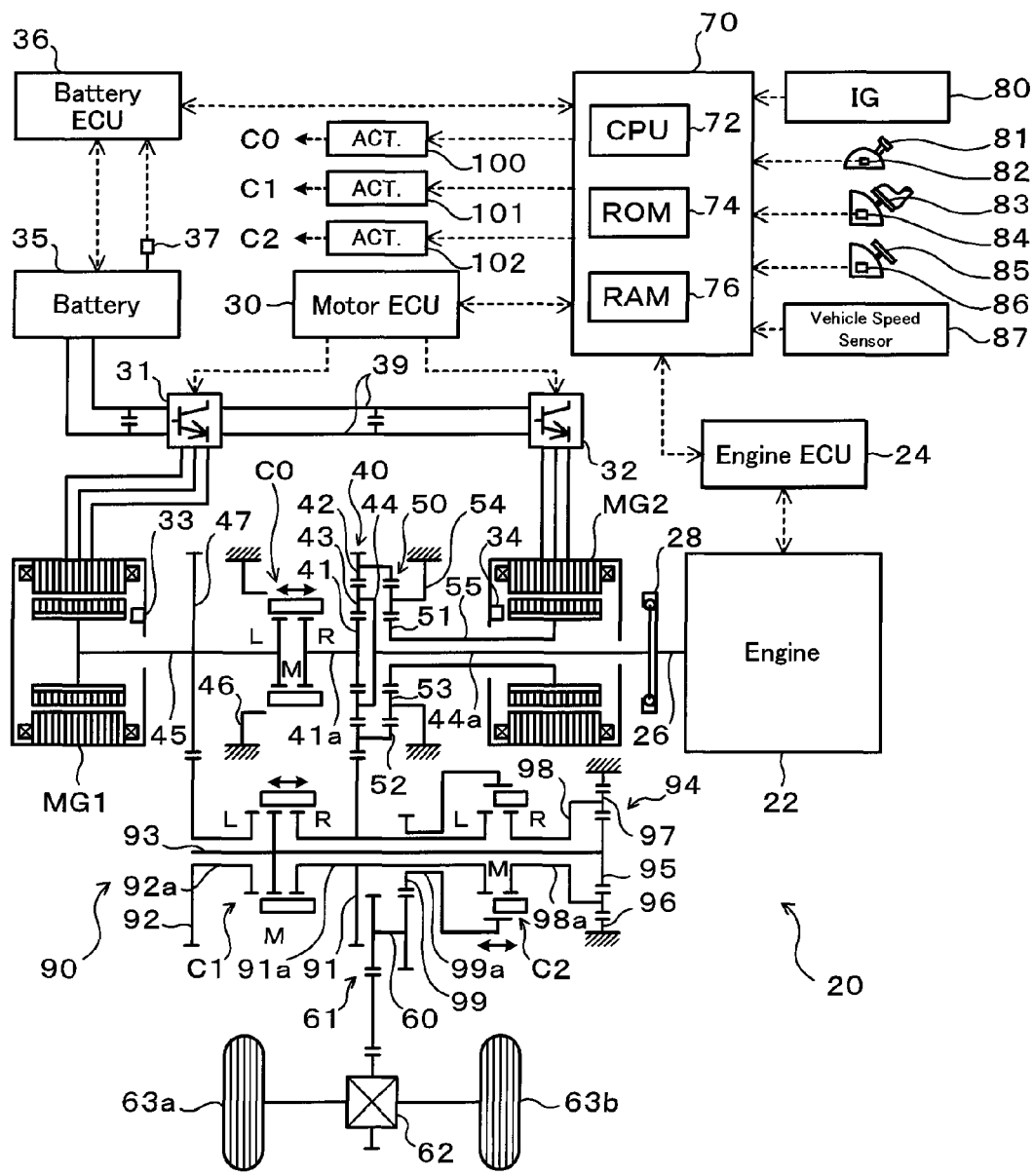
FIG. 1 schematically illustrates the configuration of a hybrid vehicle 20 in an embodiment of the invention.

FIG. 1 schematically illustrates the configuration of a hybrid vehicle 20 in an embodiment of the invention. The hybrid vehicle 20 shown in FIG. 1 is constructed as a front-wheel drive vehicle and includes an engine 22 located in a front portion of the vehicle, a power distribution integration mechanism (differential rotation mechanism) 40 connected with a crankshaft 26 or an output of the engine 22, a motor MG1 arranged coaxially with the crankshaft 26 of the engine 22 and connected with the power distribution integration mechanism 40 and designed to have power generation capability, a motor MG2 arranged coaxially with the engine 22 and the motor MG1 to be connected with the power distribution integration mechanism 40 via a reduction gear mechanism 50 and designed to have power generation capability, a transmission 90 constructed to transmit the output power of the power distribution integration mechanism 40 to a driveshaft 60 included in a gear mechanism 61 with a change of the speed change state, and a hybrid electronic control unit 70 (hereafter referred to as 'hybrid ECU') configured to control the operations of the whole hybrid vehicle 20.

The engine 22 is constructed as an internal combustion engine designed to consume a hydrocarbon fuel, such as gasoline or light oil, and thereby generate power. The engine 22 is under operation controls, such as fuel injection control, ignition timing control, and intake air flow control, of an engine electronic control unit 24 (hereafter referred to as engine ECU). The engine ECU 24 inputs diverse signals from various sensors provided for the engine 22 to measure and detect the operating conditions of the engine 22. The engine ECU 24 establishes communication with the hybrid ECU 70 to control the operations of the engine 22 in response to control signals from the hybrid ECU 70 and with reference to the diverse signals from the various sensors and to output data regarding the operating conditions of the engine 22 to the hybrid ECU 70 according to the requirements.

The motors MG1 and MG2 are constructed as known synchronous motor generators to have operations as both a generator and a motor. The motors MG1 and MG2 are arranged to transmit electric power to and from a battery 35 or an accumulator via inverters 31 and 32. Power lines 39 connecting the battery 35 with the inverters 31 and 32 are structured as common positive bus and negative bus shared by the inverters 31 and 32. Such connection enables electric power generated by one of the motors MG1 and MG2 to be consumed by the other motor MG2 or MG1. The battery 35 may thus be charged with surplus electric power generated by either of the motors MG1 and MG2 and be discharged to supplement insufficient electric power. The battery 35 is neither charged nor discharged upon the balance of the input and output of electric powers between the motors MG1 and MG2. Both the motors MG1 and MG2 are driven and controlled by a motor electronic control unit 30 (hereafter referred to as motor ECU). The motor ECU 30 inputs various signals required for driving and controlling the motors MG1 and MG2, for example, signals representing rotational positions of rotors in the motors MG1 and MG2 from rotational position detection sensors 33 and 34 and signals representing phase currents to be applied to the motors MG1 and MG2 from current sensors (not shown). The motor ECU 30 outputs switching control signals to the inverters 31 and 32. The motor ECU 30 also computes rotation speeds Nm1 and Nm2 of the rotors in the motors MG1 and MG2 according to a rotation speed computation routine (not shown) based on the input signals from the rotational position detection sensors 33 and 34. The motor ECU 30 establishes communication with the hybrid ECU 70 to drive and control the motors MG1 and MG2 in response to control signals received from the hybrid ECU 70 and to output data regarding the operating conditions of the motors MG1 and MG2 to the hybrid ECU 70 according to the requirements.

The battery 35 is under control and management of a battery electronic control unit 36 (hereafter referred to as battery ECU). The battery ECU 36 inputs signals required for management and control of the battery 35, for example, an inter-terminal voltage from a voltage sensor (not shown) located between terminals of the battery 35, a charge-discharge current from a current sensor (not shown) located in the power line 39 connecting with the output terminal of the battery 35, and a battery temperature Tb from a temperature sensor 37 attached to the battery 35. The battery ECU 36 outputs data regarding the operating conditions of the battery 35 by communication to the hybrid ECU 70 and to the engine ECU 24 according to the requirements. For the purpose of control and management of the battery 35, the battery ECU 36 also performs an arithmetic operation of calculating a remaining charge or state of charge SOC of the battery 35 from an integrated value of the charge-discharge current.

The power distribution integration mechanism 40 is located, together with the motors MG1 and MG2, the reduction gear mechanism 50, and the transmission 90, in a transmission casing (not shown) and is arranged coaxially with the crankshaft 26 across a predetermined distance from the engine 22. The power distribution integration mechanism 40 of this embodiment is constructed as a single-pinion planetary gear mechanism including a sun gear 41 designed as an external gear, a ring gear 42 designed to have both inner teeth formed on an inner circumference thereof and outer teeth formed on an outer circumference thereof and arranged concentrically with the sun gear 41, and a carrier 44 arranged to hold multiple pinion gears 43 engaging with both the sun gear 41 and the inner teeth on the ring gear 42. The sun gear 41 (second element), the ring gear 42 (first element), and the carrier 44 (third element) are the constituents of differential rotation. In the structure of the embodiment, the power distribution integration mechanism 40 is designed to have a gear ratio $\rho$ (ratio of the number of teeth of the sun gear 41 to the number of teeth of the ring gear 42) satisfying a relation of $\rho<0.5$. The sun gear 41 as the second element of the power distribution integration mechanism 40 is connected with the motor MG1 (more specifically, its rotor) or the second motor via a sun gear shaft 41a extended from the sun gear 41 in an opposite direction to the engine 22 and a first motor shaft 45 extended in the same direction. The ring gear 42 as the first element of the power distribution integration mechanism 40 is connected with the motor MG2 (more specifically, its hollow rotor) or the first motor via the reduction gear mechanism 50 located between the power distribution integration mechanism 40 and the engine 22 and a hollow second motor shaft 55 extended from the reduction gear mechanism 50 (the sun gear 51) toward the engine 22. The carrier 44 as the third element of the power distribution integration mechanism 40 is connected with the crankshaft 26 of the engine 22 via a carrier shaft 44a extended through a second motor shaft 55 and the motor MG2 and a damper 28. In the hybrid vehicle 20 of the embodiment, the constituents are arranged coaxially in the sequence of the engine 22, the motor MG2, the reduction gear mechanism 50, the power distribution integration mechanism 40, and the motor MG1 from the right to the left in the drawing.

The reduction gear mechanism 50 is constructed as a single-pinion planetary gear mechanism including a sun gear 51 as an external gear, a ring gear 52 as an internal gear arranged concentrically with the sun gear 51, multiple pinion gears 53 arranged to engage with both the sun gear 51 and the ring gear 52, and a carrier 54 arranged to hold the multiple pinion gears 53 in such a manner as to allow both their revolutions and their rotations on their axes. In the structure of the embodiment, the reduction gear mechanism 50 is designed to have a speed reduction ratio (ratio of the number of teeth of the sun gear 51 to the number of teeth of the ring gear 52) close to the gear ratio $\rho$ of the power distribution integration mechanism 40. The sun gear 51 of the reduction gear mechanism 50 is connected to the rotor of the motor MG2 via the second motor shaft 55. The ring gear 52 of the reduction gear mechanism 50 is fixed to the ring gear 42 of the power distribution integration mechanism 40, so that the reduction gear mechanism 50 is substantially integrated with the power distribution integration mechanism 40. The carrier 54 of the reduction gear mechanism 50 is fastened to the transmission casing. The function of the reduction gear mechanism 50 reduces the speed of the power from the motor MG2 and transmits the power of the reduced speed to the ring gear 42 of the power distribution integration mechanism 40, while increasing the speed of the power from the ring gear 42 and transmitting the power of the increased speed to the motor MG2. In the structure of the embodiment, the reduction gear mechanism 50 is located between the motor MG2 and the power distribution integration mechanism 40 and is integrated with the power distribution integration mechanism 40. This arrangement desirably allows the size reduction of the power output apparatus.

As shown in FIG. 1, a clutch C0 is provided between the sun gear shaft 41a and the first motor shaft 45 to function as a connecting-disconnecting device of performing connection of the sun gear shaft 41a with the first motor shaft 45 and releasing the connection and as a fixation device of fastening the first motor shaft 45 or the rotating shaft of the motor MG1 (that is, the ring gear 42) in a non-rotatable manner. In the embodiment, the clutch C0 is structured, for example, as a dog clutch that includes a dog element fastened to one end (a left end in the drawing) of the sun gear shaft 41a, a dog element fastened to one end (a right end in the drawing) of the first motor shaft 45, a fixation dog element 46 fastened to the transmission casing, and an engagement member arranged to be engageable with these dog elements and driven by an electric, electromagnetic, or a hydraulic actuator 100. The position of the engagement member as a clutch position of the clutch C0 is selectively changeable among an 'R position', an 'M position', and an 'L position' as shown in FIG. 1. At the clutch position of the clutch C0 set to the R position, the coupling of the dog element on the sun gear shaft 41a with the dog element on the first motor shaft 45 via the engagement member, that is, the connection of the motor MG1 with the sun gear 41 of the power distribution integration mechanism 40, is released. The release of the connection between the sun gear shaft 41a and the first motor shaft 45 by means of the clutch C0 disconnects the motor MG1 or the second motor from the sun gear 41 as the second element of the power distribution integration mechanism 40. The function of the power distribution integration mechanism 40 substantially separates the engine 22 from the motors MG1 and MG2 and the transmission 90. At the clutch position of the clutch C0 set to the M position, the dog element on the sun gear shaft 41a is coupled with the dog element on the first motor shaft 45 via the engagement member with the lower loss so that the motor MG1 is connected to the sun gear 41 of the power distribution integration mechanism 40. At the clutch position of the clutch C0 set to the L position, the dog element on the sun gear shaft 41a is coupled with the dog element on the first motor shaft 45 and the fixation dog element 46 via the engagement member with the lower loss so that the sun gear 41 as the second element of the power distribution integration mechanism 40 and the first motor shaft 45 (that is, the motor MG2) are fixed in a non-rotatable manner.

The transmission 90 is designed to have a speed change state (speed ratio) selectively changeable among multiple different values. The transmission 90 has a first coupling gear train including the ring gear 42 of the power distribution integration mechanism 40 and a first driven gear 91 continuously engaging with the external teeth of the ring gear 42, and a second coupling gear train including a drive gear 47 attached to the first motor shaft 45 and a second driven gear 92 continuously engaging with the drive gear 47. The transmission 90 also has a transmission shaft 93 extended in parallel to the crankshaft 26 of the engine 22, the first motor shaft 45, and the second motor shaft 55, a deceleration mechanism 94 constructed as a single-pinion planetary gear mechanism to reduce the speed of an input power at a preset speed reduction ratio and output the power of the reduced speed, an output gear shaft 99a arranged to have an output gear 99 engaging with a gear attached to a driveshaft 60, and clutches C1 and C2. The first driven gear 91 of the first coupling gear train is attached to a hollow first gear shaft 91a that is supported in a rotatable manner by a bearing (not shown) and is extended in parallel to the first motor shaft 45 and the second motor shaft 55. The second driven gear 92 of the second coupling gear train is attached to a hollow second gear shaft 92a that is supported in a rotatable manner by a bearing (not shown) to be away from the first gear shaft 91a by a preset distance and is extended in parallel to the first motor shaft 45 and the second motor shaft 55. In the structure of the embodiment, the number of the external teeth on the ring gear 42 included in the first coupling gear train is identical with the number of teeth of the drive gear 47 included in the second coupling gear train. The number of teeth of the first driven gear 91 included in the first coupling gear train is identical with the number of teeth of the second driven gear 92 included in the second coupling gear train. The numbers of teeth of these gears may be set arbitrarily.

The transmission shaft 93 passes through the first gear shaft 91a and the second gear shaft 92a to be extended in parallel with the first motor shaft 45 and the second motor shaft 55. The deceleration mechanism 94 is attached to one end (a right end in the drawing) of the transmission shaft 93. The deceleration mechanism 94 includes a sun gear 95 connected with the transmission shaft 93, a ring gear 96 arranged concentrically with the sun gear 95, and a carrier 98 arranged to hold multiple pinion gears 97 engaging with both the sun gear 95 and the ring gear 96. The sun gear 95 (input element), the ring gear 96 (fixation element), and the carrier 98 (output element) are structured as elements of differential rotation. The ring gear 96 of the deceleration mechanism 94 is fastened to the transmission casing in a non-rotatable manner as shown in FIG. 1. A hollow carrier shaft 98a is extended toward the first gear shaft 91a and is connected with the carrier 98 of the deceleration mechanism 94. The transmission shaft 93 passes through the carrier shaft 98a and is fixed to the sun gear 95. The carrier shaft 98a is supported in a rotatable manner by a bearing (not shown) to be away from the first gear shaft 91a by a preset distance. In the transmission 90, the hollow second gear shaft 92a with the second driven gear 92 attached thereto, the hollow first gear shaft 91a with the first driven gear 91 attached thereto, and the hollow carrier shaft 98a are arranged in this sequence from the left to the right in the drawing to be located around the transmission shaft 93. The output gear shaft 99a with the output gear 99 is supported by a bearing (not shown) in a rotatable manner to be located around the first gear shaft 91a (and the transmission shaft 93). The power from the output gear 99 is transmitted to the driveshaft 60 included in the gear mechanism 61 and is eventually output to front wheels 63a and 63b or drive wheels via a differential gear 62.

The clutch C1 included in the transmission 90 is located between the first gear shaft 91a and the second gear shaft 92a and is constructed to connect either one or both of the first gear shaft 91a and the second gear shaft 92a to the transmission shaft 93. In the embodiment, the clutch C1 is structured, for example, as a dog clutch that includes a first dog element fastened to one end (a left end in the drawing) of the first gear shaft 91a, a dog element fastened to the transmission shaft 93 to be located between the first gear shaft 91a and the second gear shaft 92a, a dog element fastened to one end (a right end in the drawing) of the second gear shaft 92a, and an engagement member arranged to be engageable with these dog elements and driven by an electric, electromagnetic, or a hydraulic actuator 101. The position of the engagement member as a clutch position of the clutch C1 is selectively changeable among an 'R position', an 'M position', and an 'L position', as shown in FIG. 1. At the clutch position of the clutch C1 in the transmission 90 set to the R position, the first dog element on the first gear shaft 91a is coupled with the dog element on the transmission shaft 93 via the engagement member with the lower loss so that the ring gear 42 as the first element of the power distribution integration mechanism 40 is connected to the transmission shaft 93 via the first coupling gear train and the first gear shaft 91a. In the description hereafter, this state of connection by means of the clutch C1 may be referred to as 'first element connection state'. At the clutch position of the clutch C1 to the M position, the first dog element on the first gear shaft 91a is coupled with the dog element on the transmission shaft 93 and the dog element on the second gear shaft 92a via the engagement member with the lower loss so that both the first gear shaft 91a and the second gear shaft 92a, that is, both the ring gear 42 and the sun gear 41 of the power distribution integration mechanism 40 are connected to the transmission shaft 93. In the description hereafter, this state of connection by means of the clutch C1 may be referred to as 'both elements connection state'. At the clutch position of the clutch C1 set to the L position, the dog element on the second gear shaft 92a is coupled with the dog element on the transmission shaft 93 via the engagement member with the lower loss. In this state, setting the clutch position of the clutch C0 to the M position causes the sun gear 41 as the second element of the power distribution integration mechanism 40 to be coupled with the transmission shaft 93 via the second coupling gear train and the second gear shaft 92a. In the description hereafter, this state of connection by means of the clutch C1 may be referred to as 'second element connection state'.

The clutch C2 included in the transmission 90 is located between the first gear shaft 91a and the carrier shaft 98a and is constructed to connect either one or both of the first gear shaft 91a and the carrier shaft 98a to the output gear shaft 99a. In the embodiment, the clutch C2 is structured, for example, as a dog clutch that includes a second dog element fastened to the other end (a right end in the drawing) of the first gear shaft 91a, a dog element fastened to one end (a left end in the drawing) of the carrier shaft 98a, a dog element attached to the output gear shaft 99a to be located at the periphery of the second dog element on the first gear shaft 91a and the dog element on the carrier shaft 98a, and an engagement member arranged to be engageable with these dog elements and driven by an electric, electromagnetic, or a hydraulic actuator 102. The position of the engagement member as a clutch position of the clutch C2 is selectively changeable among an 'R position', an 'M position', and an 'L position' as shown in FIG. 1. At the clutch position of the clutch C2 in the transmission 90 set to the R position, the dog element on the carrier shaft 98a is coupled with the dog element on the output gear shaft 99a via the engagement member with the lower loss so that the carrier shaft 98a, that is, the deceleration mechanism 94 is connected to the driveshaft 60 via the output gear shaft 99a and the output gear 99. In the description hereafter, this state of connection by means of the clutch C2 may be referred to as 'deceleration mechanism-driveshaft connection state'. At the clutch position of the clutch C2 set to the M position, the dog element on the carrier shaft 98a is connected with the second dog element on the first gear shaft 91a and the dog element on the output gear shaft 99a via the engagement member with the lower loss so that both the carrier shaft 98a (that is, the deceleration mechanism 94) and the first gear shaft 91a are connected to the driveshaft 60 via the output gear shaft 99a and the output gear 99. In the description hereafter, this state of connection by means of the clutch C2 may be referred to as 'simultaneous connection state'. At the clutch position of the clutch C2 set to the L position, the second dog element on the first gear shaft 91a is coupled with the dog element on the output gear shaft 99a via the engagement member with the lower loss so that the first gear shaft 91a is connected to the driveshaft 60 via the output gear shaft 99a and the output gear 99. In this state, since the first driven gear 91 and the ring gear 42 of the first coupling gear train are connected with the first gear shaft 91a, the ring gear 42 as the first element of the power distribution integration mechanism 40 is coupled with the driveshaft 60 via the first coupling gear train, the first gear shaft 91a, the output gear shaft 99a, and the output gear 99. In the description hereafter, this state of connection by means of the clutch C2 may be referred to as 'direct connection state'.

The hybrid ECU 70 is constructed as a microprocessor including a CPU 72, a ROM 74 configured to store processing programs, a RAM 76 configured to temporarily store data, input and output ports (not shown), and a communication port (not shown). The hybrid ECU 70 inputs, via its input port, an ignition signal from an ignition switch (start switch) 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, and a vehicle speed V from a vehicle speed sensor 87. The hybrid ECU 70 makes connection with the engine ECU 24, the motor ECU 30, and the battery ECU 36 via its communication port to transmit various control signals and data to and from the engine ECU 24, the motor ECU 30, and the battery ECU 36 as mentioned previously. The actuator 100, 101, and 102 actuating the clutch C0 and the clutches C1 and C2 of the transmission 90 is also under control of the hybrid ECU 70.

The series of operations of the hybrid vehicle 20 constructed as discussed above are explained with reference to FIGS. 2 through 11.

FIGS. 2 through 7 are explanatory views showing torque-rotation speed dynamics of the primary elements in the power distribution integration mechanism 40 and in the transmission 90 in the case of an upshift change of the speed ratio of the transmission 90 in response to a variation in vehicle speed during drive of the hybrid vehicle 20 with operation of the engine 22. FIG. 8 is a table showing combinations of the clutch position of the clutch C0 and the clutch positions of the clutches C1 and C2 included in the transmission 90 during drive of the hybrid vehicle 20. During drive of the hybrid vehicle 20 in the states of FIGS. 2 through 7, under overall control of the hybrid ECU 70 based on the driver's depression amount of the accelerator pedal 83 and the vehicle speed V, the operation of the engine 22 is controlled by the engine ECU 24, while the operations of the motors MG1 and MG2 are controlled by the motor ECU 30. The actuators 100, 101, and 102 (the clutch C0 and the clutches C1 and C2 in the transmission 90) are directly controlled by the hybrid ECU 70. In the charts of FIGS. 2 through 7, an S-axis represents a rotation speed of the sun gear 41 in the power distribution integration mechanism 40 (equivalent to a rotation speed Nm1 of the motor MG1 or the first motor shaft 45). A C-axis represents a rotation speed of the carrier 44 in the power distribution integration mechanism 40 (equivalent to a rotation speed Ne of the engine 22). An R-axis represents a rotation speed of the ring gear 42 in the power distribution integration mechanism 40 (equivalent to a rotation speed of the ring gear 52 in the reduction gear mechanism 50). A 54-axis represents a rotation speed of the carrier 54 in the reduction gear mechanism 50. A 51-axis represents a rotation speed of the sun gear 51 in the reduction gear mechanism 50 (equivalent to a rotation speed Nm2 of the motor MG2 or the second motor shaft 55). A 91,92,95-axis represents rotation speeds of the first driven gear 91 (the first gear shaft 91a), the second driven gear 92 (the second gear shaft 92a), and the sun gear 95 of the deceleration mechanism 94 in the transmission 90. A 99-axis represents a rotation speed of the output gear 99 (the output gear shaft 99a). A 96-axis represents a rotation speed of the ring gear 96 of the deceleration mechanism 94. A 60-axis represents a rotation speed of the driveshaft 60.

Figure 2:
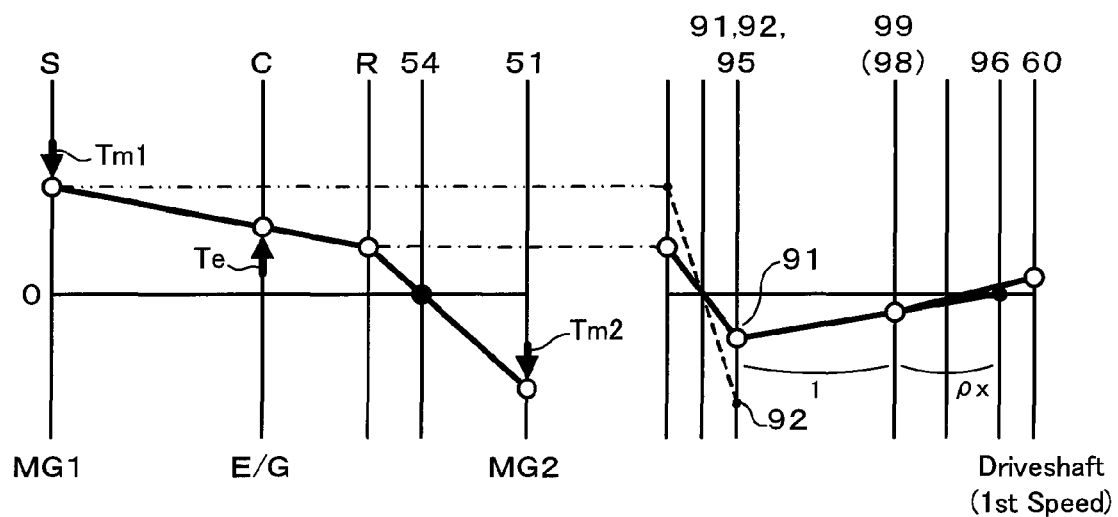
FIG. 2 is an explanatory view showing torque-rotation speed dynamics of primary elements in a power distribution integration mechanism 40 and in a transmission 90 in the case of an upshift of the speed ratio of the transmission 90 with a change of the vehicle speed during a drive of the hybrid vehicle 20 of the embodiment with operation of an engine 22.
Figure 9:
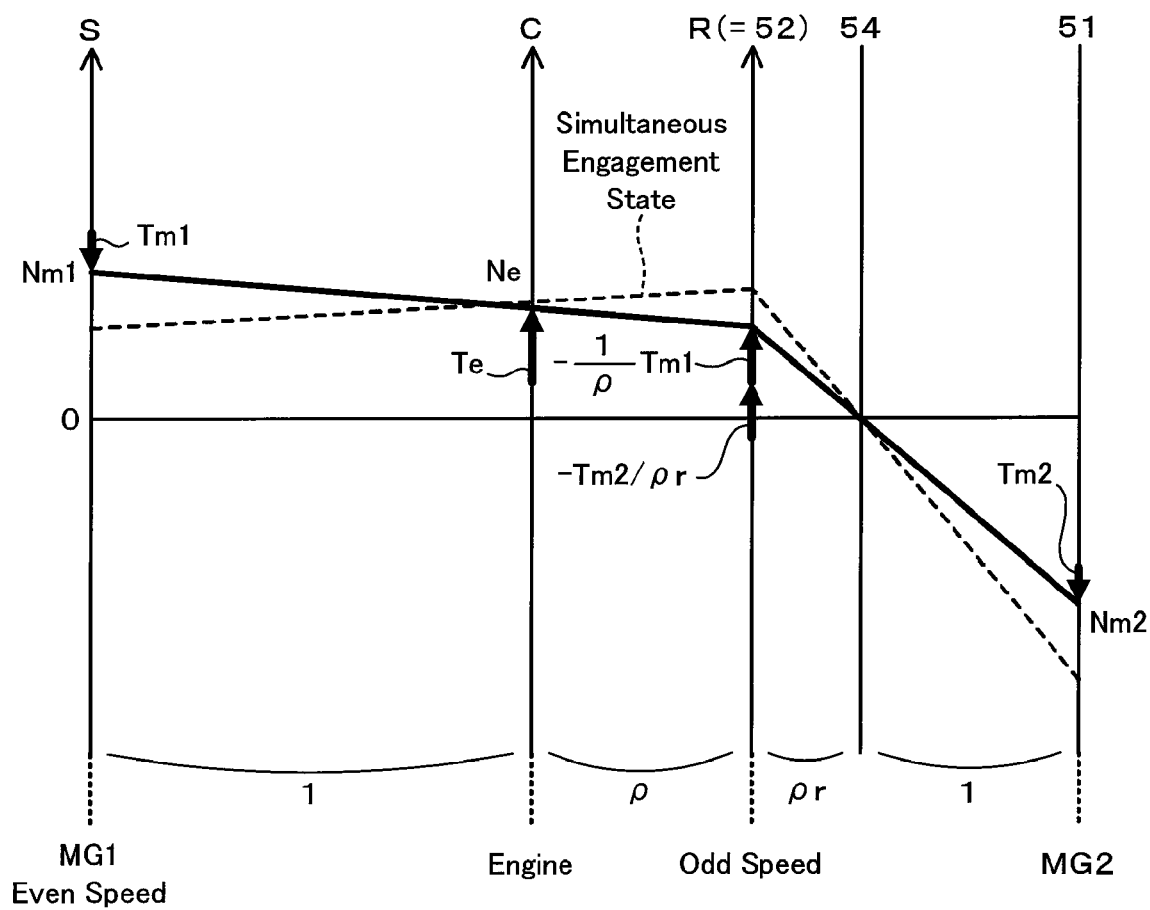
FIG. 9 is an alignment chart showing torque-rotation speed dynamics of the respective elements in the power distribution integration mechanism 40 and in a reduction gear mechanism 50 in a mode of making a motor MG1 function as a generator and a motor MG2 function as a motor.

During drive of the hybrid vehicle 20 with operation of the engine 22, the clutch C0 is basically set to the M position, so that the motor MG1 or the first motor shaft 45 is connected with the sun gear 41 of the power distribution integration mechanism 40 via the sun gear shaft 41a. In a relatively low range of the vehicle speed V of the hybrid vehicle 20, both the clutches C1 and C2 of the transmission 90 are set to the R position (see FIG. 8). In the description hereafter, this state is referred to as 'first speed state ($1^{st}$ speed)' of the transmission 90 (FIG. 2). In the first speed state, the ring gear 42 as the first element of the power distribution integration mechanism 40 is connected to the transmission shaft 93 via the first coupling gear train (the first driven gear 91), the first gear shaft 91a, and the clutch C1. The carrier 98 (the carrier shaft 98a) as the output element of the deceleration mechanism 94 connecting with the transmission shaft 93 is connected to the driveshaft 60 via the clutch C2, the output gear shaft 99a, and the output gear 99. In the first speed state, the motors MG1 and MG2 are thus driven and controlled to set the ring gear 42 of the power distribution integration mechanism 40 to the output element and make the motor MG2 connecting with the ring gear 42 via the reduction gear mechanism 50 function as a motor and to make the motor MG1 connecting with the sun gear 41 set to the reaction force element function as a generator. In this state, the power distribution integration mechanism 40 distributes the power of the engine 22 input via the carrier 44 into the sun gear 41 and the ring gear 42 according to its gear ratio ρ, while integrating the power of the engine 22 with the power of the motor MG2 functioning as the motor and outputting the integrated power to the ring gear 42. In the description hereafter, the mode of making the motor MG1 function as the generator and the motor MG2 function as the motor is referred to as 'first torque conversion mode'. FIG. 9 is an alignment chart showing torque-rotation speed dynamics of the respective elements in the power distribution integration mechanism 40 and in the reduction gear mechanism 50 in the first torque conversion mode. In the alignment chart of FIG. 9, an S-axis, a C-axis, an R-axis, a 54-axis, and a 51-axis represent the same as those in the charts of FIGS. 2 through 7. In FIG. 9, ρ and ρr respectively denote the gear ratio of the power distribution integration mechanism 40 and the speed reduction ratio of the reduction gear mechanism 50. In the alignment chart of FIG. 9 (also in the charts of FIGS. 2 through 7 and alignment charts of FIGS. 10 and 11), thick arrows on the respective axes show torques applied to the corresponding elements, and upward arrows and downward arrows respectively show positive torques and negative torques. In the first torque conversion mode, the power from the engine 22 is subjected to torque conversion by means of the power distribution integration mechanism 40 and the motors MG1 and MG2 and is output to the ring gear 42. Controlling the rotation speed of the motor MG1 enables the ratio of the rotation speed of the engine 22 to the rotation speed of the ring gear 42 as the output element to be varied in a stepless and continuous manner. As shown in FIG. 2, the power output to the ring gear 42 is subjected to speed change at a speed ratio of the first coupling gear train consisting of the external teeth of the ring gear 42 and the first driven gear 91 and is transmitted to the transmission shaft 93, while being subjected to speed change (speed reduction) at a speed ratio $(\rho x/(1+\rho x))$ based on a gear ratio $\rho x$ of the deceleration mechanism 94 (see FIG. 2) and output to the driveshaft 60.

Figure 3:
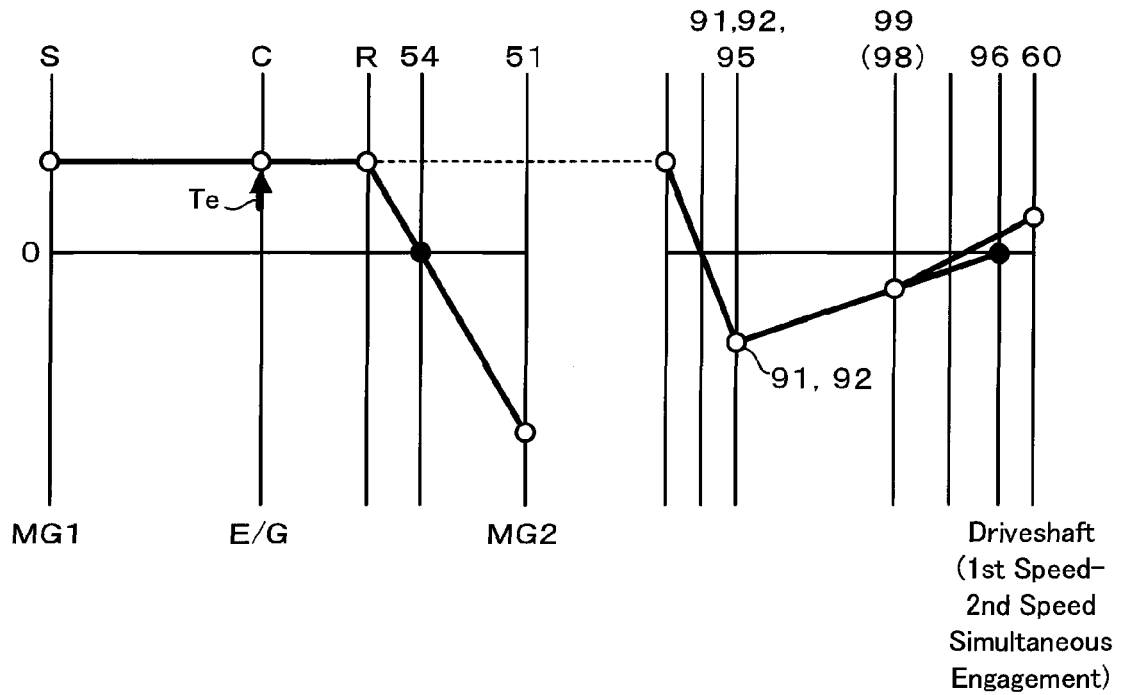
FIG. 3 is an explanatory view similar to FIG. 2.

In the state of FIG. 2 where the torque conversion mode is set to the first torque conversion mode and the transmission 90 has the first speed state, an increase in vehicle speed V of the hybrid vehicle 20 makes the rotation speed of the ring gear 42 of the power distribution integration mechanism 40 gradually approach to the rotation speeds of the sun gear 41 and of the drive gear 47. This causes the rotation speed of the second driven gear 92 to be substantially equal to the rotation speed of the first driven gear 91 in the transmission 90 (see FIG. 3). In this state, the clutch position of the clutch C1 is changed to the M position, where the first dog element on the first gear shaft 91a is coupled with the dog element on the second gear shaft 92a and the dog element on the transmission shaft 93, so that both the ring gear 42 and the sun gear 41 of the power distribution integration mechanism 40 are connected to the driveshaft 60 via the transmission shaft 93 and the deceleration mechanism 94. At the clutch position of the clutch C1 set to the M position and the clutch position of the clutch C2 set to the R position in the transmission 90, setting the value '0' to torque commands of the motors MG1 and MG2 causes the motors MG1 and MG2 to run idle with performing neither power operation nor regenerative operation. As shown in FIG. 3, the power (torque) from the engine 22 is then mechanically (directly) transmitted to the driveshaft 60 at a fixed (constant) speed ratio (a value between the speed ratio in the first speed state and the speed ratio in the second speed state) without conversion into electrical energy. In the description hereafter, the mode of connecting both the ring gear 42 and the sun gear 41 of the power distribution integration mechanism 40 to the driveshaft 60 via the transmission shaft 93 and the deceleration mechanism 94 by means of the clutch C1 is referred to as a 'simultaneous engagement mode'. The state of FIG. 3 is specifically called '$1^{st}$ speed-$2^{nd}$ speed simultaneous engagement state'.

Figure 4:
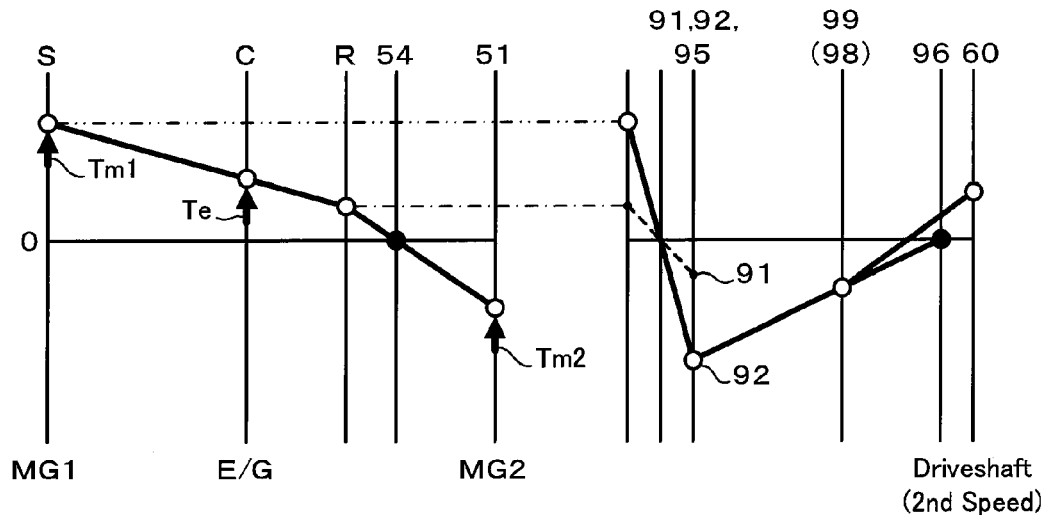
FIG. 4 is an explanatory view similar to FIG. 2.
Figure 10:
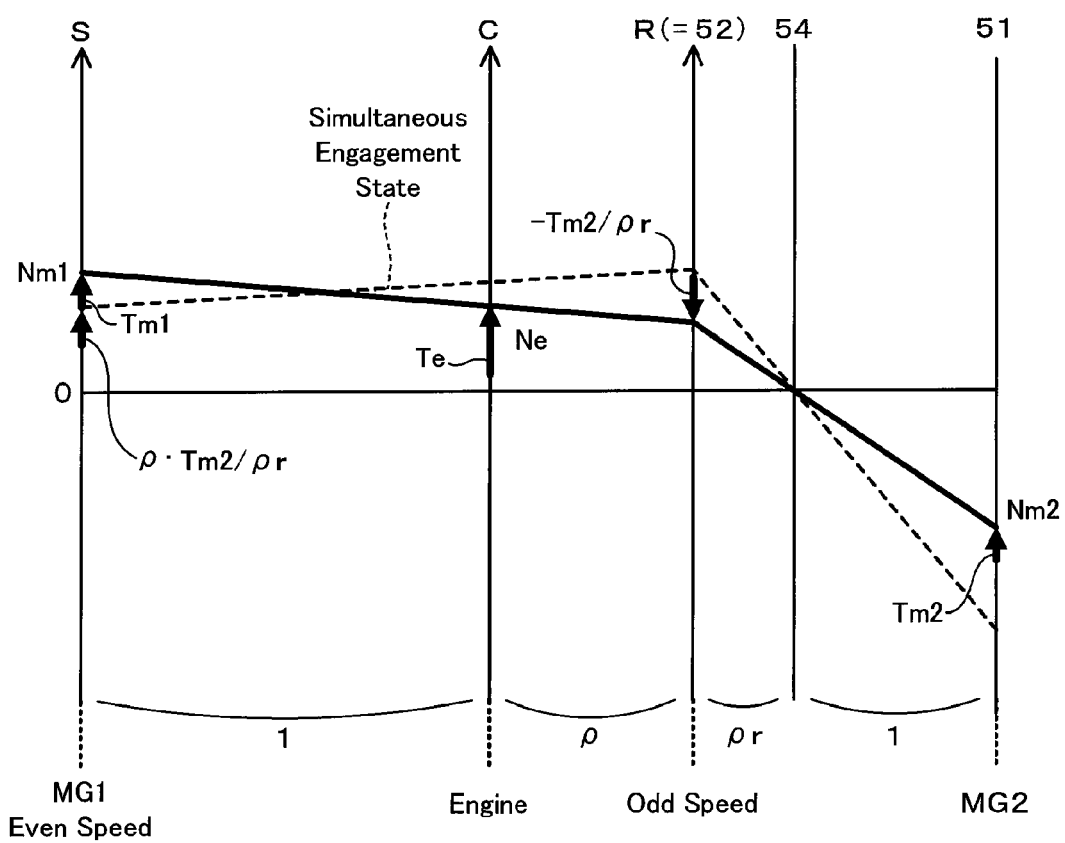
FIG. 10 is an alignment chart showing torque-rotation speed dynamics of the respective elements in the power distribution integration mechanism 40 and in the reduction gear mechanism 50 in a mode of making the motor MG2 function as a generator and the motor MG1 function as a motor.

In the $1^{st}$ speed-$2^{nd}$ speed simultaneous engagement state of FIG. 3, the rotation speed of the first gear shaft 91a is equal to the rotation speed of the second gear shaft 92a. The clutch position of the clutch C1 in the transmission 90 is thus readily changed from the M position to the L position to release the connection of the first gear shaft 91a (first coupling gear train) with the transmission shaft 93. In the description hereafter, the state of setting the clutch position of the clutch C1 to the L position and the clutch position of the clutch C2 to the R position is referred to as 'second speed state ($2^{nd}$ speed)' of the transmission 90 (FIG. 4). In the second speed state, the sun gear 41 as the second element of the power distribution integration mechanism 40 is connected to the transmission shaft 93 via the second coupling gear train (consisting of the drive gear 47 and the second driven gear 92), the second gear shaft 92a, and the clutch C1. The carrier 98 (the carrier shaft 98a) as the output element of the deceleration mechanism 94 connecting with the transmission shaft 93 is connected to the driveshaft 60 via the clutch C2, the output gear shaft 99a, and the output gear 99. In the second speed state, the motors MG1 and MG2 are thus driven and controlled to set the sun gear 41 of the power distribution integration mechanism 40 to the output element and make the motor MG1 connecting with the sun gear 41 function as a motor and to make the motor MG2 connecting with the ring gear 42 set to the reaction force element function as a generator. In this state, the power distribution integration mechanism 40 distributes the power of the engine 22 input via the carrier 44 into the sun gear 41 and the ring gear 42 according to its gear ratio $\rho$, while integrating the power of the engine 22 with the power of the motor MG1 functioning as the motor and outputting the integrated power to the sun gear 41. In the description hereafter, the mode of making the motor MG2 function as the generator and the motor MG1 function as the motor is referred to as 'second torque conversion mode'. FIG. 10 is an alignment chart showing torque-rotation speed dynamics of the respective elements in the power distribution integration mechanism 40 and in the reduction gear mechanism 50 in the second torque conversion mode. The symbols in FIG. 10 have the same meanings as those of the symbols in FIG. 9. In the second torque conversion mode, the power from the engine 22 is subjected to torque conversion by means of the power distribution integration mechanism 40 and the motors MG1 and MG2 and is output to the sun gear 41. Controlling the rotation speed of the motor MG2 enables the ratio of the rotation speed of the engine 22 to the rotation speed of the sun gear 41 as the output element to be varied in a stepless and continuous manner. As shown in FIG. 4, the power output to the sun gear 41 (the first motor shaft 45) is subjected to speed change at a speed ratio of the second coupling gear train consisting of the drive gear 47 and the second driven gear 92 and is transmitted to the transmission shaft 93, while being subjected to speed change (speed reduction) at the speed ratio $(\rho x/(1+\rho x))$ based on the gear ratio $\rho x$ of the deceleration mechanism 94 and output to the driveshaft 60.

Figure 5:
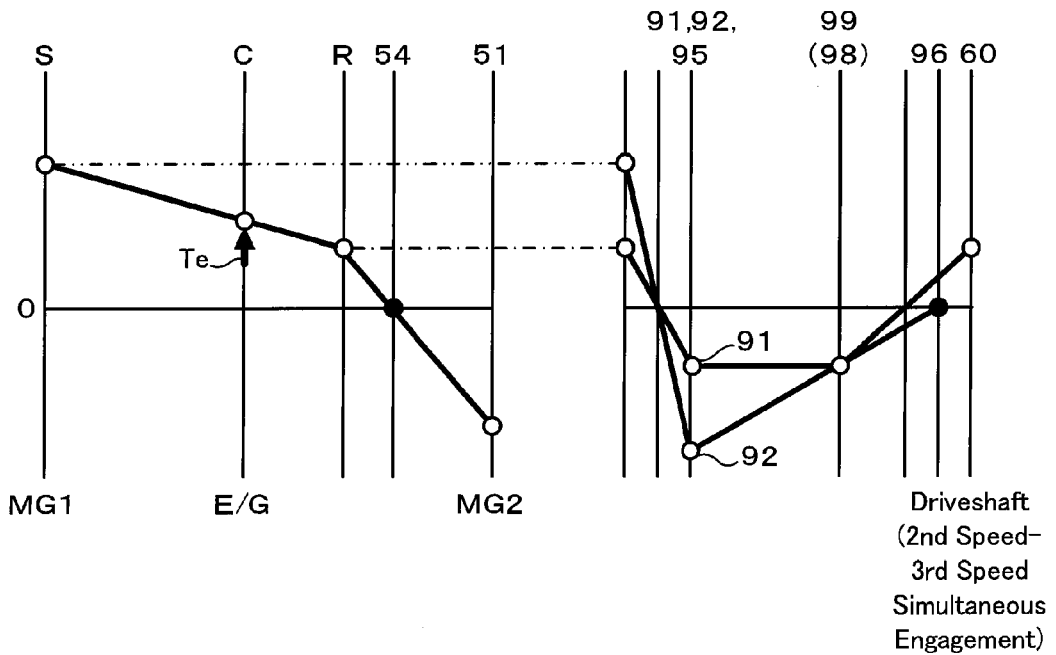
FIG. 5 is an explanatory view similar to FIG. 2.

In the state of FIG. 4 where the torque conversion mode is set to the second torque conversion mode and the transmission 90 has the second speed state, an increase in vehicle speed V of the hybrid vehicle 20 makes the rotation speed of the first gear shaft 91a (the first driven gear 91) that is not connected to the transmission shaft 93 gradually approach to the rotation speed of the output gear shaft 99a (the output gear 99) (see FIG. 5). In this state, the clutch position of the clutch C2 is changed to the M position, where the dog element on the carrier shaft 98a is coupled with the dog element on the output gear shaft 99a and the second dog element on the first gear shaft 91a, so that the sun gear 41 of the power distribution integration mechanism 40 can be connected to the driveshaft 60 via the second coupling gear train, the clutch C1, the transmission shaft 93, the carrier 98, and the output gear 99, while enabling the ring gear 42 of the power distribution integration mechanism 40 to be connected to the driveshaft 60 via the first coupling gear train, the first gear shaft 91a, the clutch C2, and the output gear 99. At the clutch position of the clutch C2 set to the M position and the clutch position of the clutch C1 set to the L position in the transmission, setting the value '0' to the torque commands of the motors MG1 and MG2 causes the motors MG1 and MG2 to run idle with performing neither power operation nor regenerative operation. As shown in FIG. 5, the power (torque) from the engine 22 is then mechanically (directly) transmitted to the driveshaft 60 at a fixed (constant) speed ratio (a value between the speed ratio in the second speed state and the speed ratio in the third speed state) without conversion into electrical energy. In the description hereafter, the mode of connecting both the first gear shaft 91a (the ring gear 42) and the carrier shaft 98a (the sun gear 41) to the transmission shaft 93 by means of the clutch C2 is also referred to as the 'simultaneous engagement mode'. The state of FIG. 5 is specifically called '$2^{nd}$ speed-$3^{rd}$ speed simultaneous engagement state'.

Figure 6:
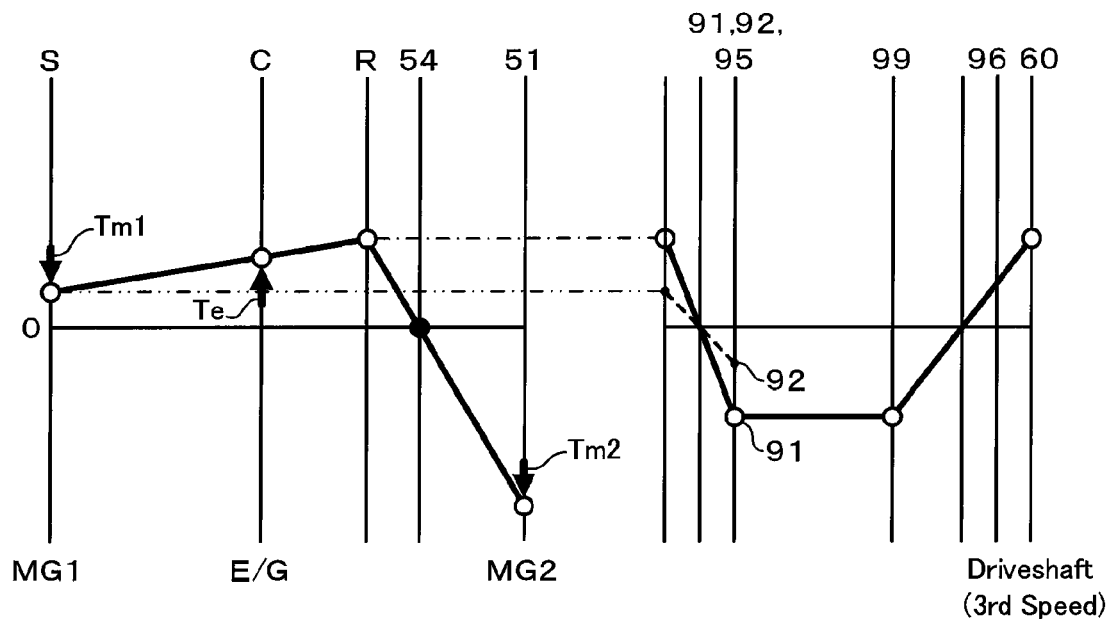
FIG. 6 is an explanatory view similar to FIG. 2.

In the $2^{nd}$ speed-$3^{rd}$ speed simultaneous engagement state of FIG. 5, the rotation speed of the first gear shaft 91a is equal to the rotation speed of the carrier shaft 98a and the rotation speed of the output gear shaft 99a. The clutch position of the clutch C2 in the transmission 90 is thus readily changed from the M position to the L position to release the connection of the carrier shaft 98a with the output gear shaft 99a. In the description hereafter, the state of setting the clutch position of the clutch C1 to the L position and the clutch position of the clutch C2 to the L position is referred to as 'third speed state ($3^{rd}$ speed)' of the transmission 90 (FIG. 6). In the third speed state, the ring gear 42 as the first element of the power distribution integration mechanism 40 is connected to the driveshaft 60 via the first coupling gear train (the first driven gear 91), the first gear shaft 91a, the clutch C2, the output gear shaft 99a, and the output gear 99. In this state, the ring gear 42 and the sun gear 41 of the power distribution integration mechanism 40 are respectively set to the output element and to the reaction force element, so that the torque conversion mode is set to the first torque conversion mode. As shown in FIG. 6, controlling the rotation speed of the motor MG1 enables the ratio of the rotation speed of the engine 22 to the rotation speed of the driveshaft 60 mechanically (directly) connected to the ring gear 42 as the output element to be varied in a stepless and continuous manner.

Figure 7:
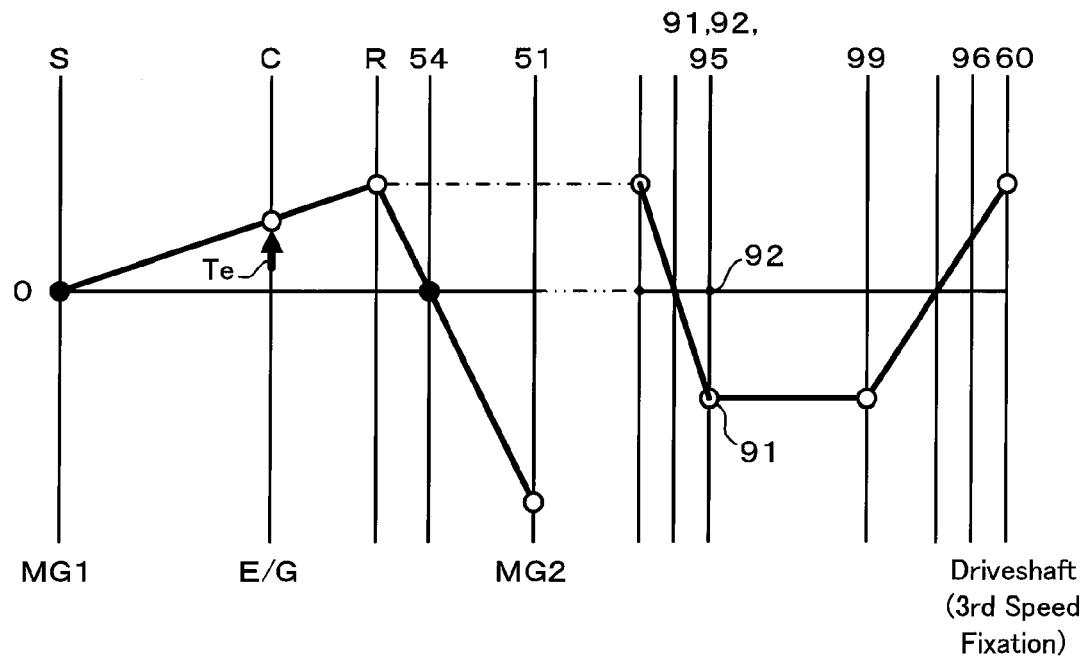
FIG. 7 is an explanatory view similar to FIG. 2.

In the state of FIG. 6 where the torque conversion mode is set to the first torque conversion mode and the transmission 90 has the third speed state, an increase in vehicle speed V of the hybrid vehicle 20 makes the rotation speeds of the motor MG1, the first motor shaft 45, and the sun gear 41 as the second element of the power distribution integration mechanism 40 gradually approach to 0. In this state, the clutch position of the clutch C0 is changed from the M position to the L position, where the first motor shaft 45 (the motor MG1) and the sun gear 41 are fastened in a non-rotatable manner as shown in FIG. 7. In the state of fastening the first motor shaft 45 and the sun gear 41 in a non-rotatable manner by means of the clutch C0 with keeping the connection of the first gear shaft 91a with the output gear shaft 99a by means of the clutch C2 of the transmission 90, setting the value '0' to the torque commands of the motors MG1 and MG2 causes the motors MG1 and MG2 to run idle with performing neither power operation nor regenerative operation. The power (torque) from the engine 22 is then directly transmitted to the driveshaft 60 after speed change at a fixed (constant) speed ratio (a value greater than the speed ratio in the third speed state) without conversion into electrical energy. In the description hereafter, the mode of fastening the first motor shaft 45 and the sun gear 41 in a non-rotatable manner by means of the clutch C0 with keeping the connection of the first gear shaft 91a with the output gear shaft 99a by means of the clutch C2 of the transmission 90 is also referred to as the 'simultaneous engagement mode'. The state of FIG. 7 is specifically called '$3^{rd}$ speed fixation state'. The series of operations described above is performed basically in a reverse flow for a downshift change of the speed ratio of the transmission 90.

As described above, in the hybrid vehicle 20 of the embodiment, the torque conversion mode is alternately changed over between the first torque conversion mode and the second torque conversion mode with a change of the speed change state (speed ratio) of the transmission 90 from the first speed state to the third speed state. Such alternate change of the torque conversion mode desirably prevents the rotation speed Nm1 or Nm2 of one motor MG1 or MG2 functioning as a generator from decreasing to a negative value with an increase of the rotation speed Nm2 or Nm1 of the other motor MG2 or MG1 functioning as a motor. The configuration of the hybrid vehicle 20 thus effectively prevents the occurrence of power circulation in the first torque conversion mode as well as the occurrence of power circulation in the second torque conversion mode, thus improving the power transmission efficiency in a wider driving range. The power circulation in the first torque conversion mode is that, in response to a decrease of the rotation speed of the motor MG1 to a negative value, the motor MG2 consumes part of the power output to the ring gear 42 to generate electric power, while the motor MG1 consumes the electric power generated by the motor MG2 to output power. The power circulation in the second torque conversion mode is that, in response to a decrease of the rotation speed of the motor MG2 to a negative value, the motor MG1 consumes part of the power output to the sun gear 41 to generate electric power, while the motor MG2 consumes the electric power generated by the motor MG1 to output power. Prevention of such power circulation restricts the maximum rotation speeds of the motors MG1 and MG2 and thus desirably allows size reduction of the motors MG1 and MG2. During drive of the hybrid vehicle 20 in the simultaneous engagement mode, the power from the engine 22 is mechanically (directly) transmitted to the driveshaft 60 at the respective fixed speed ratios intrinsic to the $1^{st}$ speed-$2^{nd}$ speed simultaneous engagement state, the $2^{nd}$ speed-$3^{rd}$ speed simultaneous engagement state, and the $3^{rd}$ speed fixation state. This arrangement desirably increases the opportunity of mechanically outputting the power from the engine 22 to the driveshaft 60 without conversion into electrical energy, thus further improving the power transmission efficiency in the wider driving range. In general, in the power output apparatus having the engine, the two motors, and the power distribution integration mechanism, such as the planetary gear mechanism, there is a greater fraction of conversion of the engine output power into electrical energy at a relatively large speed reduction ratio between the engine and the driveshaft. This lowers the power transmission efficiency and tends to cause heat evolution from the motors MG1 and MG2. The simultaneous engagement mode discussed above is thus especially advantageous for the relatively large speed reduction ratio between the engine 22 and the driveshaft 60. In the hybrid vehicle 20 of the embodiment, the torque conversion mode is changed over between the first torque conversion mode and the second torque conversion mode via the simultaneous engagement mode at the time of a change of the speed change state in the transmission 90. This arrangement effectively prevents a torque-off condition at the time of a change of the speed change state and ensures a smooth and shockless change of the speed change state, that is, a smooth and shockless changeover of the torque conversion mode between the first torque conversion mode and the second torque conversion mode.

Figure 11:
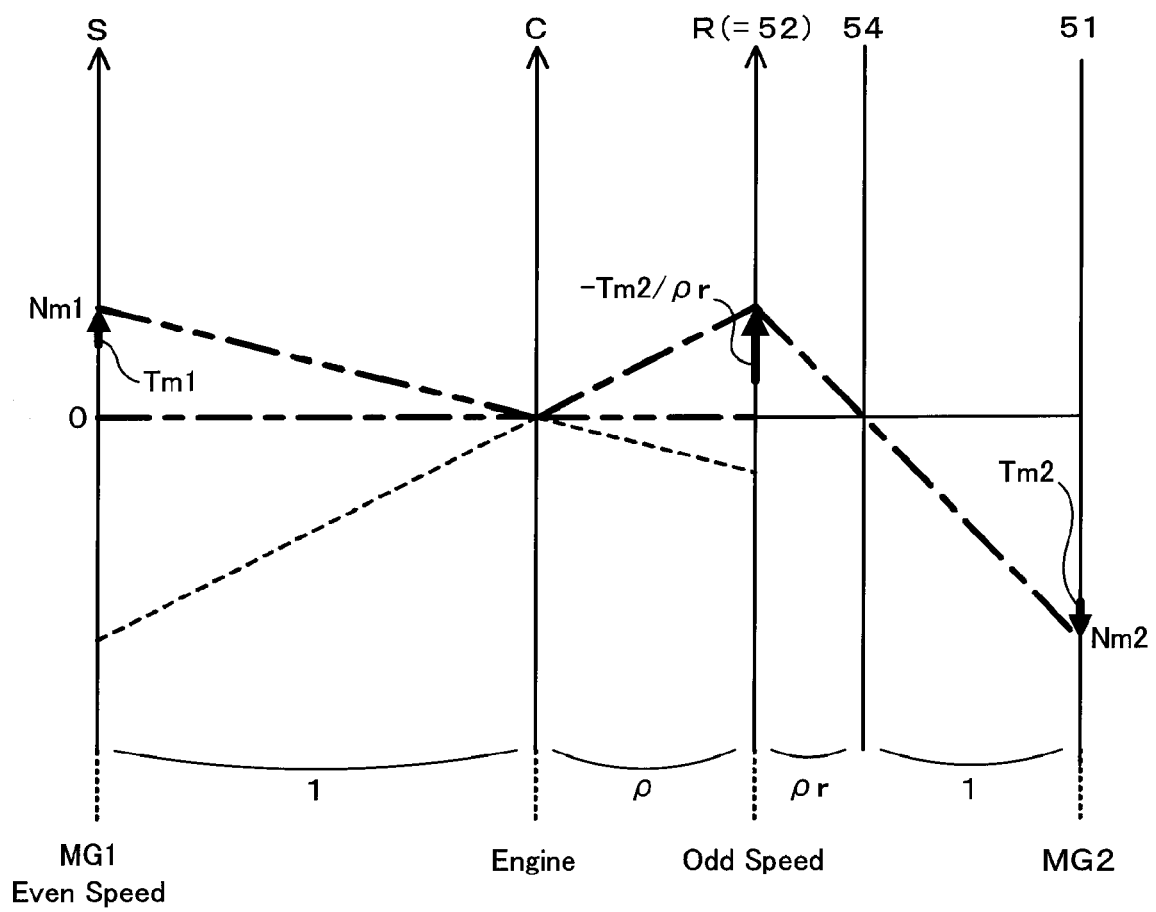
FIG. 11 is an explanatory view for explaining a motor drive mode in the hybrid vehicle 20 of the embodiment.

The following describes the outline of the motor drive mode, where the engine 22 stops its operation and at least one of the motors MG1 and MG2 consumes the electric power supplied from the battery 35 and outputs the driving power to drive the hybrid vehicle 20, with reference to FIGS. 8 and 11. The motor drive mode of the hybrid vehicle 20 of the embodiment has three different modes, a clutch-engaged 1-motor drive mode, a clutch-released 1-motor drive mode, and a 2-motor drive mode. In the clutch-engaged 1-motor drive mode, either one of the motor MG1 and MG2 is controlled to output driving power, while the clutch position of the clutch C0 is set to the M position and the connection of the motor MG1 with the sun gear 41 of the power distribution integration mechanism 40 is maintained. In the clutch-released 1-motor drive mode, either one of the motor MG1 and MG2 is controlled to output driving power, while the clutch position of the clutch C0 is set to the R position and the connection of the motor MG1 with the sun gear 41 of the power distribution integration mechanism 40 is released. In the 2-motor drive mode, both the motors MG1 and MG2 are controlled to output driving power, while the clutch position of the clutch C0 is set to the R position.

In the clutch-engaged 1-motor drive mode, at the clutch position of the clutch C0 set to the M position, setting the clutch positions of the clutches C1 and C2 as shown in FIG. 8 sets the transmission 90 to either the first speed state or the third speed state and drives and controls only the motor MG2 to output driving power. Alternatively at the clutch position of the clutch C0 set to the M position, setting the clutch positions of the clutches C1 and C2 as shown in FIG. 8 sets the transmission 90 to the second speed state and drives and controls only the motor MG1 to output driving power. In this clutch-engaged 1-motor drive mode, the clutch C0 connects the sun gear 41 of the power distribution integration mechanism 40 with the first motor shaft 45. Such connection causes one motor MG1 or MG2 that does not output the driving power to be followed up and idled by the other motor MG2 or MG1 that outputs the driving power (as shown by a broken line in FIG. 11). In the clutch-released 1-motor drive mode, at the clutch position of the clutch C0 set to the R position, setting the clutch positions of the clutches C1 and C2 as shown in FIG. 8 sets the transmission 90 to either the first speed state or the third speed state and drives and controls only the motor MG2 to output driving power. Alternatively at the clutch position of the clutch C0 set to the R position, setting the clutch positions of the clutches C1 and C2 as shown in FIG. 8 sets the transmission 90 to the second speed state and drives and controls only the motor MG1 to output driving power. In this clutch-released 1-motor drive mode, the clutch position of the clutch C0 is set to the R position to disconnect the sun gear 41 from the first motor shaft 45 (from the motor MG1). Such disconnection prevents the follow-up of the crankshaft 26 of the engine 22 stopped by the function of the power distribution integration mechanism 40, while preventing the follow-up of the motor MG1 or MG2 stopped according to the setting of the clutch position of either the clutch C2 or the clutch C1 as shown by a one-dot chain line and a two-dot chain line in FIG. 11. This arrangement desirably prevents a decrease of the power transmission efficiency. In the 2-motor drive mode, at the clutch position of the clutch C0 set to the R position, setting the clutch positions of the clutches C1 and C2 as shown in FIG. 8 sets the transmission 90 to either the $1^{st}$ speed-$2^{nd}$ speed simultaneous engagement state or the $2^{nd}$ speed-$3^{rd}$ speed simultaneous engagement state and drives and controls at least one of the motors MG1 and MG2 to output driving power. Such drive control enables both the motors MG1 and MG2 to output the driving power, while effectively preventing the follow-up of the engine 22. This arrangement allows transmission of large power to the driveshaft 60 in the motor drive mode, thus ensuring a good hill start and the favorable towing performance in the motor drive mode.

In selection of the clutch-released 1-motor drive mode, the hybrid vehicle 20 of the embodiment is capable of readily changing the speed change state (the speed ratio) of the transmission 90 to ensure efficient transmission of the power to the driveshaft 60. For example, in the clutch-released 1-motor drive mode with setting the transmission 90 to the first speed state and driving and controlling only the motor MG2 to output driving power, the adjustment of the rotation speed Nm1 of the motor MG1 to rotate the second driven gear 92 in synchronism with the first driven gear 91, in combination with a changeover of the clutch position of the clutch C1 in the transmission 90 from the R position to the M position, ensures a shift to the $1^{st}$ speed-$2^{nd}$ speed simultaneous engagement state, that is, the 2-motor drive mode. In this state, the output of driving power from only the motor MG1 in combination with a changeover of the clutch position of the clutch C1 from the M position to the L position enables the output power of the motor MG1 to the transmitted to the driveshaft 60 in the second speed state. In the clutch-released 1-motor drive mode with setting the transmission 90 to the second speed state and driving and controlling only the motor MG1 to output driving power, the adjustment of the rotation speed Nm2 of the motor MG2 to rotate the first gear shaft 91a in synchronism with the output gear shaft 99a, in combination with a changeover of the clutch position of the clutch C2 in the transmission 90 from the R position to the M position, ensures a shift to the $2^{nd}$ speed-$3^{rd}$ speed simultaneous engagement state, that is, the 2-motor drive mode. In this state, the output of driving power from only the motor MG2 in combination with a changeover of the clutch position of the clutch C2 from the M position to the L position enables the output power of the motor MG2 to be transmitted to the driveshaft 60 in the third speed state. In the hybrid vehicle 20 of the embodiment, the transmission 90 is used to change the rotation speed of the ring gear 42 or the sun gear 41 and amplify the torque in the motor drive mode. This arrangement desirably lowers the maximum torques required for the motors MG1 and MG2 and thus ensures size reduction of the motors MG1 and MG2. In the process of a change of the speed change state (the speed ratio) of the transmission 90 in the motor drive mode, the hybrid vehicle 20 of the embodiment transits the simultaneous engagement state of the transmission 90, that is, the 2-motor drive mode. This arrangement effectively prevents a torque-off condition at the time of a change of the speed change state and ensures a smooth and shockless change of the speed change state. In the motor drive mode, in response to an increase in driving force demand or in response to a decrease in state of charge SOC of the battery 35, the hybrid vehicle 20 of the embodiment controls one motor MG1 or MG2 that does not output the driving power to crank the engine 22 according to the speed change state of the transmission 90 and thereby starts the engine 22.

As described above, the hybrid vehicle 20 of the embodiment is equipped with the transmission 90, which includes the transmission shaft 93 extended substantially in parallel with the crankshaft 26, the first motor shaft 45, and the second motor shaft 55, the first coupling gear train arranged in combination with the second coupling gear train and the clutch C1 to function as the first connection device and selectively connect the ring gear 42 as the first element and the sun gear 41 as the second element of the power distribution integration mechanism 40 to the transmission shaft 93, the deceleration mechanism 94 arranged to function as the speed change mechanism and have the carrier 98 as the output element and the sun gear 95 as the input element connecting with the transmission shaft 93 and constructed to change speed of the power from the transmission shaft 93 at a preset speed ratio and output the power of the changed speed from the carrier 98, and the clutch C2 arranged to function as the second connection device and selectively connect the carrier 98 of the deceleration mechanism 94 and at least one of the first element and the second element of the power distribution integration mechanism 40 to the driveshaft 60.

In the hybrid vehicle 20 of the embodiment discussed above, in the state of connection of either one of the ring gear 42 and the sun gear 41 of the power distribution integration mechanism 40 with the transmission shaft 93 by means of the clutch C1 and the other relevant constituents of the transmission 90, the connection of the carrier 98 of the deceleration mechanism 94 with the driveshaft 60 by means of the clutch C2, the output gear shaft 99$a$, and the output gear 99 enables the power from either the ring gear 42 or the sun gear 41 of the power distribution integration mechanism 40 to be subjected to speed reduction by the deceleration mechanism 94 and output to the driveshaft 60. The connection of the ring gear 42 of the power distribution integration mechanism 40 with the driveshaft 60 by means of the first gear shaft 91$a$, the clutch C2, the output gear shaft 99$a$, and the output gear 99 of the transmission 90 enables the power from the ring gear 42 to be mechanically and directly output to the driveshaft 60. The hybrid vehicle 20 equipped with the transmission 90 accordingly enables the power from the power distribution integration mechanism 40 to be subjected to speed change at multiple different stages and output to the driveshaft 60. In the state of connection of the ring gear 42 of the power distribution integration mechanism 40 with the transmission shaft 93 by means of the clutch C1 and the other relevant constituents of the transmission 90 or in the state of connection of the ring gear 42 of the power distribution integration mechanism 40 with the driveshaft 60 by means of the clutch C2, the motor MG2 connecting with the ring gear 42 or the output element is controlled to function as a motor, while the motor MG1 connecting with the sun gear 41 or the reaction force element is controlled to function as a generator. In the state of connection of the sun gear 41 of the power distribution integration mechanism 40 with the driveshaft 93 by means of the clutch C1 and the other relevant constituents of the transmission 90, on the other hand, the motor MG1 connecting with the sun gear 41 or the output element is controlled to function as a motor, while the motor MG2 connecting with the ring gear 42 or the reaction force element is controlled to function as a generator. In the hybrid vehicle 20 of the embodiment, adequate changeover of the clutch positions of the clutches C1 and C2 thus effectively prevents the rotation speed Nm1 or Nm2 of one motor MG1 or MG2 functioning as a generator from decreasing to a negative value with an increase of the rotation speed Nm2 or Nm1 of the other motor MG2 or MG1 functioning as a motor. This configuration of the hybrid vehicle 20 effectively prevents the occurrence of power circulation, thus increasing the power transmission efficiency in a wider driving range and improving both the fuel consumption and the driving performance.

The transmission 90 of the above configuration does not significantly increase the dimension of the power output apparatus in its axial direction (that is, in the vehicle width direction), even in the substantially coaxial arrangement of the engine 22, the motors MG1 and MG2, and the power distribution integration mechanism 40 as the constituents of the power output apparatus. The transmission 90 causes at least one of the ring gear 42 as the first element and the sun gear 41 as the second element of the power distribution integration mechanism 40 to be connected to the transmission shaft 93 by means of the two parallel shaft-type gear trains, that is, the first coupling gear train and the second coupling gear train. Even in the presence of the clutch C0 arranged as discussed above, there is a relatively small distance between the first coupling gear train and the second coupling gear train. In the structure of the transmission 90, the first driven gear 91 of the first coupling gear train, the second driven gear 92 of the second coupling gear train, the deceleration mechanism 94, the clutch C1, the clutch C2, the output gear 99, and the output gear shaft 99$a$ are all arranged around and coaxially with the transmission shaft 93. This arrangement allows a biaxial structure of the power output apparatus including the engine 22, the motors MG1 and MG2, the power distribution integration mechanism 40, and the transmission 90. The substantially coaxial arrangement of the engine 22, the motors MG1 and MG2, and the power distribution integration mechanism 40 thus does not significantly increase the dimension of the power output apparatus in the vehicle width direction. The power output apparatus of this arrangement is accordingly space-saving to be suitably mounted on a vehicle and is especially preferable for the hybrid vehicle 20 mainly driven with the front drive wheels 63$a$ and 63$b$.

The transmission 90 includes the parallel shaft-type first coupling gear train (the combination of the external teeth of the ring gear 42 with the first driven gear 91) continuously connected with the ring gear 42 of the power distribution integration mechanism 40, the parallel shaft-type second coupling gear train (the combination of the drive gear 47 with the second driven gear 92) continuously connected with the sun gear 41 at the clutch position of the clutch C0 set to the M position, and the clutch C0 arranged to selectively change over the clutch position between the first element connection state (R position) of connecting the first coupling gear train to the transmission shaft 93 and the second element connection state (L position) of connecting the second coupling gear train to the transmission shaft 93. The parallel shaft-type first and second coupling gear trains and the clutch C0 constitute the first connection device of the transmission 90. This arrangement enables the ring gear 42 and the sun gear 41 of the power distribution integration mechanism 40 to be selectively connected to the transmission shaft 93, while preventing an increase in dimension of the first connection device in the axial direction of the transmission shaft 93, that is, an increase in distance between the first coupling gear train and the second coupling gear train. The connection of either the ring gear 42 or the sun gear 41 of the power distribution integration mechanism 40 to the transmission shaft 93 by means of the parallel shaft-type first coupling gear train or the parallel shaft-type second coupling gear train allows a speed ratio between the ring gear 42 or the sun gear 41 and the transmission shaft 93 to be freely set. This desirably increases the degree of freedom in setting the speed ratio in the transmission 90 and further improves the power transmission efficiency. In the structure of the embodiment discussed above, the external teeth are formed on the ring gear 42 of the power distribution integration mechanism 40 to form part of the first coupling gear train. This structure is, however, neither essential nor restrictive. Instead of the external teeth formed on the ring gear 42, a gear similar to the drive gear 47 may alternatively be provided to be in contact with the ring gear 42 and engage with the first driven gear 91 to form the first coupling gear train. The deceleration mechanism 94 as the speed change mechanism of the transmission 90 may be constructed as a three element-type planetary gear mechanism where the power input from the transmission shaft 93 to the sun gear 95 is subjected to speed reduction at a preset speed reduction ratio and is output from the carrier 98. This arrangement ensures size reduction of the transmission 90. The deceleration mechanism 94 of the transmission 90 may be constructed as a planetary gear mechanism including a first sun gear and a second gear arranged to have mutually different numbers of teeth and a carrier arranged to hold at least one stepped gear constructed by connecting of a first pinion gear engaging with the first sun gear with a second pinion gear engaging with the second sun gear. Application of the planetary gear mechanism including the stepped gear to the deceleration mechanism 94 allows a greater speed reduction ratio to be easily set, compared with a transmission equipped with a single-pinion planetary gear mechanism having the tendency of increasing the rotation speed of a pinion gear in the process of setting a greater speed reduction ratio.

The clutch position of the clutch C1 in the transmission 90 is selectively changeable among the first element connection state (R position), the second element connection state (L position), and the both elements connection state (M position) of connecting both the first coupling gear train and the second coupling gear train to the transmission shaft 93. Setting the clutch position of the clutch C1 to the M position or the both elements connection state enables the power from the engine 22 to be mechanically (directly) transmitted to the driveshaft 60 at a fixed speed ratio. The clutch position of the clutch C2 in the transmission 90 is selectively changeable among the deceleration mechanism-driveshaft connection state (R position) of connecting the carrier 98 of the deceleration mechanism 94 to the driveshaft 60 via the output gear 99, the direct connection state (L position) of connecting the ring gear 42 of the power distribution integration mechanism 40 to the driveshaft 60 via the first coupling gear train, the first gear shaft 91a, and the output gear 99, and the simultaneous connection state (M position) of connecting both the carrier 98 of the deceleration mechanism 94 and the ring gear 42 of the power distribution integration mechanism 40 to the driveshaft 60. Setting the clutch position of the clutch C2 to the M position or the simultaneous connection state also enables the power from the engine 22 to be mechanically (directly) transmitted to the driveshaft 60 at a fixed speed ratio as explained previously. The clutch C0 provided in the hybrid vehicle 20 is capable of fixing the first motor shaft 45 or the rotating shaft of the motor MG1 in a non-rotatable manner. In the state of connection of the ring gear 42 of the power distribution integration mechanism 40, which connects with the motor MG2, with the driveshaft 60 by means of the clutch C2 of the transmission 90, the fixation of the first motor shaft 45 in a non-rotatable manner by means of the clutch C0 also enables the power from the engine 22 to be mechanically (directly) transmitted to the driveshaft 60 at a fixed speed ratio. This arrangement of the hybrid vehicle 20 effectively enhances the power transmission efficiency in the wider driving range. The fixation device should be designed to fix the rotation of the reaction force element (the sun gear 41 in the embodiment) of the power distribution integration mechanism at the speed ratio set to a minimum value in the transmission. In some structure of the transmission, the fixation device may be designed to fix the second motor shaft 55 of the motor MG2 or the ring gear 42. Instead of the clutch C0 arranged to have the function of the fixation device, a brake may be provided separately from the clutch C0 to fix the first motor shaft 45 (the sun gear 41) or the second motor shaft 55 (the ring gear 42) in a non-rotatable manner.

The hybrid vehicle 20 of the embodiment has the clutch C0 arranged to perform a connection and a release of the connection of the sun gear 41a with the first motor shaft 45 or the connection of the sun gear 41 with the motor MG1. In the hybrid vehicle 20 of the embodiment, the release of the connection of the sun gear 41a with the first motor shaft 45 by means of the clutch C0 enables the engine 22 to be substantially separated from the motors MG1 and MG2 and the transmission 90 by the function of the power distribution integration mechanism 40. Setting the clutch position of the clutch C0 to the R position in combination with stopping the operation of the engine 22 causes the power from at least one of the motors MG1 and MG2 to be efficiently transmitted to the driveshaft 60 with a change of the speed change state (speed ratio) of the transmission 90 in the hybrid vehicle 20. The hybrid vehicle 20 of this arrangement thus desirably lowers the maximum torques required for the motors MG1 and MG2 and thereby ensures size reduction of the motors MG1 and MG2. The clutch C0 is not restrictively structured to perform a connection and a release of the connection of the sun gear 41 with the motor MG1. The clutch C0 may be structured to perform a connection and a release of the connection of the ring gear 42 (the first element) with the second motor shaft 55 (the motor MG2) or may be structured to perform a connection and a release of the connection of the crankshaft 26 of the engine 22 with the carrier 44 (the third element).

As described previously, the hybrid vehicle 20 of the embodiment is equipped with the power distribution integration mechanism 40 constructed as the single-pinion planetary gear mechanism having the gear ratio $\rho$ of lower than the value 0.5. In the power distribution integration mechanism 40 of this specification, the ring gear 42 has a greater torque distribution fraction from the engine 22, compared with the sun gear 41. The arrangement of the reduction gear mechanism 50 between the ring gear 42 and the motor MG2 as in the structure of the embodiment discussed above ensures size reduction and power loss reduction of the motor MG2. In this arrangement, setting a speed reduction ratio $\rho r$ of the reduction gear mechanism 50 close to the gear ratio $\rho$ of the power distribution integration mechanism 40 enables the motors MG1 and MG2 to have substantially identical specifications. Such setting desirably improves the productivity of the hybrid vehicle 20 or the power output apparatus and reduces the manufacturing cost of the hybrid vehicle 20 or the power output apparatus.

Figure 12:
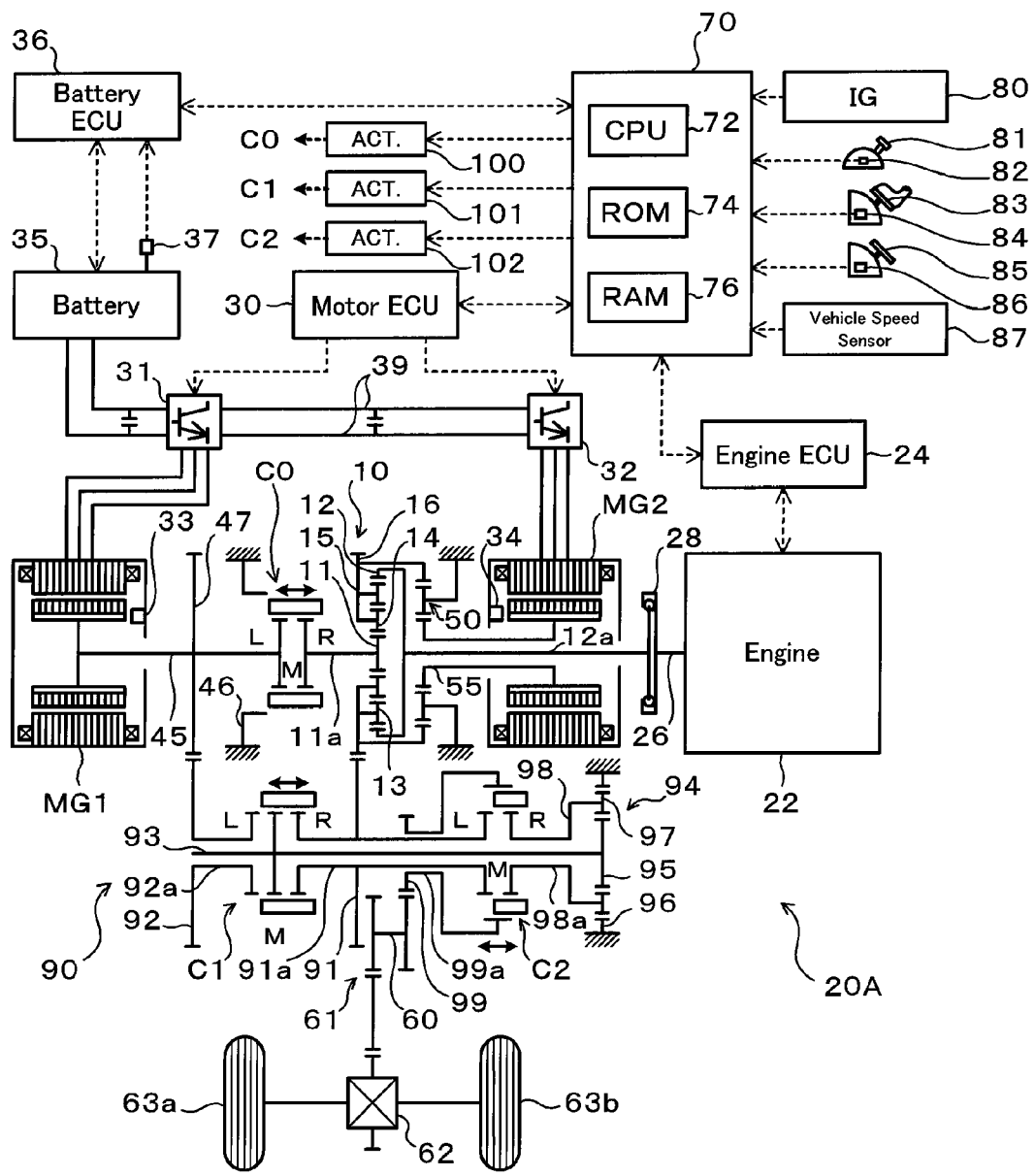
FIG. 12 schematically illustrates the configuration of a hybrid vehicle 20A in one modified example.

FIG. 12 schematically illustrates the configuration of a hybrid vehicle 20A in one modified example of the embodiment. The hybrid vehicle 20A of FIG. 12 has a power distribution integration mechanism 10 constructed as a double-pinion planetary gear mechanism, in place of the power distribution integration mechanism 40 constructed as the single-pinion planetary gear mechanism. The power distribution integration mechanism 10 includes a sun gear 11 as an external gear, a ring gear 12 as an internal gear arranged concentrically with the sun gear 11, and a carrier 15 arranged to hold at least one set of two pinion gears 13 and 14, which engage with each other and respectively engage with the sun gear 11 and with the ring gear 12, in such a manner as to allow both their revolutions and their rotations on their axes. In the structure of this modified example, the power distribution integration mechanism 10 is constructed to have a gear ratio $\rho$ (ratio of the number of teeth of the sun gear 11 to the number of teeth of the ring gear 12) satisfying a relation of $\rho<0.5$. The sun gear 11 as a second element of the power distribution integration mechanism 10 is connected with the motor MG1 (specifically, its rotor) as the second motor via a sun gear shaft 11a extended from the sun gear 11 in a direction opposite to the engine 22, the clutch C0, and the first motor shaft 45. The carrier 15 as a first element of the power distribution integration mechanism 10 is connected with the motor MG2 (specifically, its hollow rotor) via the reduction gear mechanism 50 located between the power distribution integration mechanism 10 and the engine 22 and the hollow second motor shaft 55. The ring gear 12 as a third element of the power distribution integration mechanism 10 is connected with the crankshaft 26 of the engine 22 via a ring gear shaft 12a extended to pass through the second motor shaft 55 and the motor MG2 and the damper 28. In the structure of this modified example, an external gear 16 is combined with the first driven gear 91 to form the first coupling gear train and is fixed to the carrier 15.

The hybrid vehicle 20A equipped with the power distribution integration mechanism 10 has the similar effects and functions to those of the hybrid vehicle 20 of the embodiment discussed above. In the application of the power distribution integration mechanism 10 constructed as the double-pinion planetary gear mechanism having the gear ratio ρ of less than the value 0.5, the carrier 15 has the greater torque distribution fraction from the engine 22, compared with the sun gear 11. As shown in the modified example of FIG. 12, the arrangement of the reduction gear mechanism 50 between the carrier 15 and the motor MG2 ensures size reduction and power loss reduction of the motor MG2. In this arrangement, setting the speed reduction ratio ρr of the reduction gear mechanism 50 close to a value ρ/(1−ρ), where ρ represents a gear ratio of the power distribution integration mechanism 10, enables the motors MG1 and MG2 to have substantially identical specifications. Such setting desirably improves the productivity of the hybrid vehicle 20A or the power output apparatus and reduces the manufacturing cost of the hybrid vehicle 20A or the power output apparatus. The power distribution integration mechanism 10 as the double-pinion planetary gear mechanism may be constructed to have the gear ratio ρ satisfying a relation of ρ>0.5. In this modified arrangement, the reduction gear mechanism 50 may be arranged to have a speed reduction ratio close to a value (1−ρ)/ρ and may be located between the sun gear 11 and the motor MG1 or the motor MG2.

Figure 13:
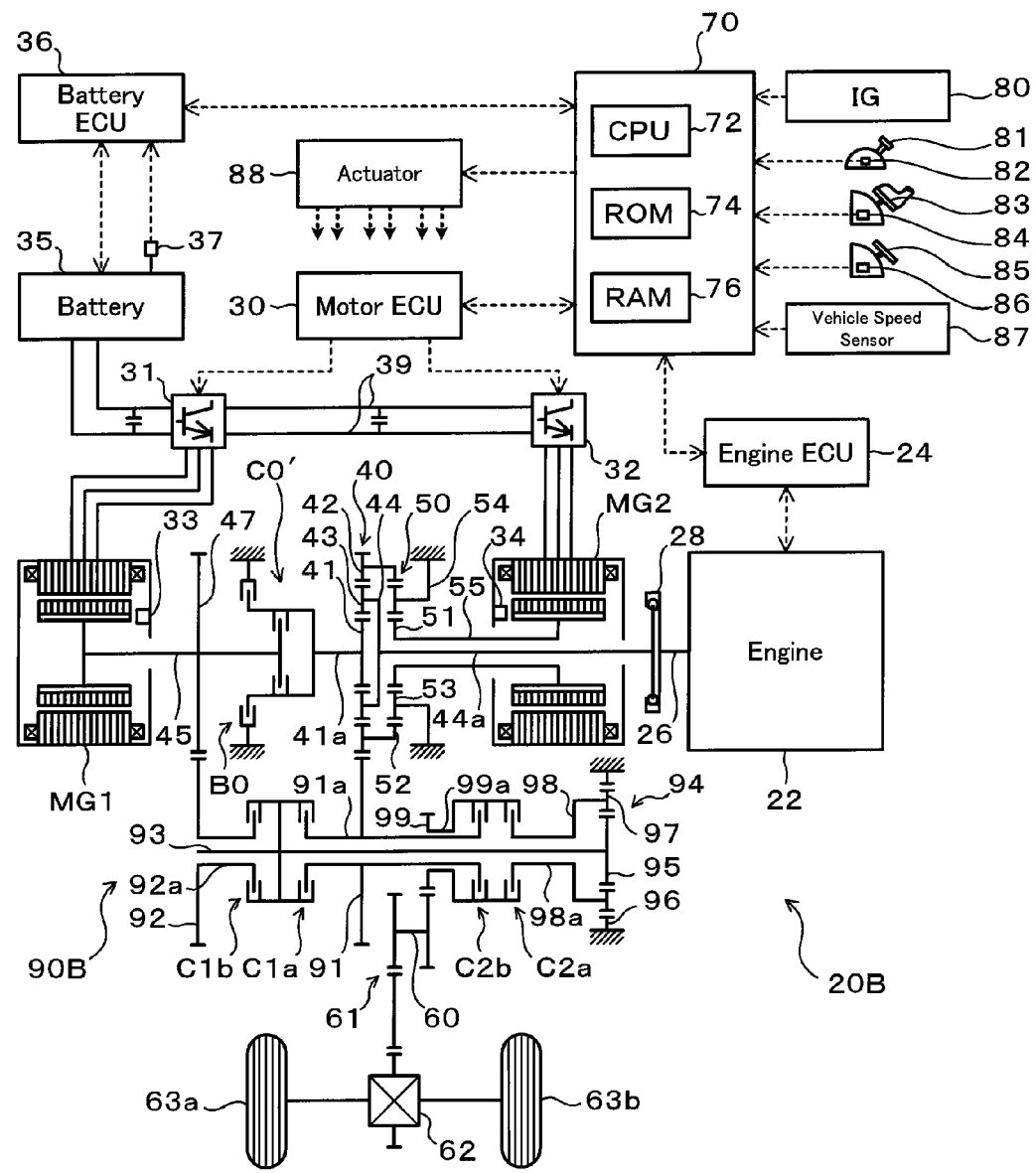
FIG. 13 schematically illustrates the configuration of a hybrid vehicle 20B in one modified example.

FIG. 13 schematically illustrates the configuration of a hybrid vehicle 20B as another modified example of the embodiment. The hybrid vehicle 20B of FIG. 13 assigns the function of the clutch C0 provided in the hybrid vehicle 20 of the above embodiment into a clutch C0' and a brake B0, which are both driven by a hydraulic actuator 88. The hybrid vehicle 20B is equipped with a transmission 90B constructed to assign the function of the clutch C1 into a clutch C1a and a clutch C1b, which are also driven by the hydraulic actuator 88 and assign the function of the clutch C2 into a clutch C2a and a clutch C2b, which are also driven by the hydraulic actuator 88. In the hybrid vehicle 20B of this modified example, the clutch C0' is operated to perform a connection and a release of the connection of the sun gear 41 of the power distribution integration mechanism 40 with the first motor shaft 45 (the motor MG1), while the brake B0 is operated to fix the first motor shaft 45 or the rotating shaft of the motor MG1 in a non-rotatable manner. Coupling the clutch C1a in the transmission 90B activates the first element connection state of connecting the ring gear 42 as the first element of the power distribution integration mechanism 40 to the transmission shaft 93 via the first coupling gear train and the first gear shaft 91a. Coupling the clutch C1b in the transmission 90B activates the second element connection state of connecting the sun gear 41 as the second element of the power distribution integration mechanism 40 to the transmission shaft 93 via the second coupling gear train and the second gear shaft 92a. Coupling both the clutches C1a and C1b in the transmission 90B activates the both elements connection state of connecting both the first gear shaft 91a and the second gear shaft 92a, that is, both the ring gear 42 and the sun gear 41 of the power distribution integration mechanism 40, to the transmission shaft 93 (the deceleration mechanism 94). Coupling the clutch C2a in the transmission 90B activates the deceleration mechanism-driveshaft connection state of connecting the carrier shaft 98a or the deceleration mechanism 94 to the driveshaft 60 via the output gear shaft 99a and the output gear 99. Coupling the clutch C2b in the transmission 90B activates the direct connection state of connecting the ring gear 42 of the power distribution integration mechanism 40 to the driveshaft 60 via the first coupling gear train, the first gear shaft 91a, the output gear shaft 99a, and the output gear 99. Coupling both the clutches C2a and C2b in the transmission 90B activates the simultaneous connection state of connecting both the carrier shaft 98a (the deceleration mechanism 94) and the first gear shaft 91a to the driveshaft 60 via the output gear shaft 99a and the output gear 99. FIG. 14 is a table showing combinations of the clutch position of the clutch C0', the brake position of the brake B0, and the clutch positions of the clutches C1a, C1b, C2a, and C2b included in the transmission 90B during drive of the hybrid vehicle 20B. The hybrid vehicle 20B equipped with the hydraulic clutch C0', the hydraulic brake B0, and the transmission 90B including the hydraulic clutches C1a, C1b, C2a, and C2b has the similar functions and effects to those of the hybrid vehicles 20 and 20A discussed above.

In the hybrid vehicles 20, 20A, and 20B discussed above, any or all of the mechanism of performing a connection and a release of the connection of the sun gear 41 with the motor MG1, the mechanism of fixing the first motor shaft 45 (the sun gear 41) or the second motor shaft 55 (the ring gear 42), and the reduction gear mechanism 50 may be omitted when not required. Any of the hybrid vehicles 20, 20A, and 20B discussed above may be constructed as a front-wheel drive-based four-wheel drive vehicle. The above embodiment and its modified examples describe the power output apparatuses mounted on the hybrid vehicles 20, 20A, and 20B. The power output apparatus of the invention is, however, not restrictively applied to such hybrid vehicles but may be mounted on diversity of moving bodies including various vehicles other than motor vehicles, boats and ships, and aircraft or may be built in stationary equipment, such as construction machinery.

The embodiment and its modified examples discussed above are to be considered in all aspects as illustrative and not restrictive. There may be many other modifications, changes, and alterations without departing from the scope or spirit of the main characteristics of the present invention.

INDUSTRIAL APPLICABILITY

The technique of the invention is preferably applied to the manufacturing industries of power output apparatuses and hybrid vehicles.

The invention claimed is:

1. A power output apparatus configured to output power to a driveshaft, the power output apparatus comprising:
   an internal combustion engine;
   a first motor constructed to input and output power;
   a second motor constructed to input and output power;
   a power distribution integration mechanism configured to have a first element connecting with a rotating shaft of the first motor, a second element connecting with a rotating shaft of the second motor, and a third element connecting with an engine shaft of the internal combustion engine and arranged to allow mutually differential rotations of the three elements; and
   a speed change-transmission assembly constructed to include a transmission shaft, a first connection device arranged to selectively connect the first element and the second element of the power distribution integration mechanism to the transmission shaft, a speed change mechanism having an output element and an input element connected to the transmission shaft and configured to change speed of power from the transmission shaft at a preset speed ratio and output the power of the changed speed from the output element, and a second connection device arranged to selectively connect the output element of the speed change mechanism and at least one of the first element and the second element of the power distribution integration mechanism to the driveshaft.

2. The power output apparatus in accordance with claim 1, wherein the transmission shaft of the speed change-transmission assembly is extended substantially in parallel with the rotating shaft of the first motor and with the rotating shaft of the second motor, wherein the first motor and the second motor are arranged substantially coaxially with the internal combustion engine, and wherein the power distribution integration mechanism is located between the first motor and the second motor and is arranged substantially coaxially with the first motor and the second motor.

3. The power output apparatus in accordance with claim 1, wherein the first connection device of the speed change-transmission assembly includes a first parallel shaft-type gear train connected to the first element, a second parallel shaft-type gear train connected to the second element, and a changeover unit arranged to selectively change over a connection state between a first element connection state of connecting the first parallel shaft-type gear train to the transmission shaft and a second element connection state of connecting the second parallel shaft-type gear train to the transmission shaft.

4. The power output apparatus in accordance with claim 3, wherein the changeover unit of the first connection device is arranged to selectively change over the connection state among the first element connection state, the second element connection state, and a both elements connection state of connecting both of the first parallel shaft-type gear train and the second parallel shaft-type gear train to the transmission shaft.

5. The power in accordance with claim 1, wherein the second connection device of the speed change-transmission assembly is constructed to selectively change over a connection state among a speed change mechanism-driveshaft connection state of connecting the output element of the speed change mechanism to the driveshaft, a direct connection state of connecting either one of the first element and the second element of the power distribution integration mechanism to the driveshaft, and a simultaneous connection state of connecting the output element of the speed change mechanism and either one of the first element and the second element of the power distribution integration mechanism to the driveshaft.

6. The power output apparatus in accordance with claim 1, the power output apparatus further comprising:
a fixation device configured to fix either one of the rotating shaft of the first motor and the rotating shaft of the second motor in a non-rotatable manner.

7. The power output apparatus in accordance with claim 1, the power output apparatus further having:
a connecting-disconnecting device that is arranged to perform any of a connection and a release of the connection of the first motor with the first element, a connection and a release of the connection of the second motor with the second element, and a connection and a release of the connection of the internal combustion engine with the third element.

8. The power output apparatus in accordance with claim 1, wherein the speed change mechanism of the speed change-transmission assembly is a deceleration mechanism configured to decelerate power input from the transmission shaft into the input element at a preset speed reduction ratio and output the power of the reduced speed from the output element.

9. The power output apparatus in accordance with claim 1, wherein the speed change mechanism of the speed change-transmission assembly is a three element-type planetary gear mechanism.

10. The power output apparatus in accordance with claim 1, wherein one of the first element and the second element of the power distribution integration mechanism is specified to receive a greater torque from the third element connected to the engine shaft and is connected to either the first motor or the second motor through a deceleration device configured to reduce a rotation speed of the rotating shaft of the first motor or the second motor.

11. The power output apparatus in accordance with claim 10, wherein the power distribution integration mechanism is a single-pinion planetary gear mechanism including a sun gear, a ring gear, and a carrier arranged to hold at least one pinion gear engaging with both the sun gear and the ring gear, the first element being one of the sun gear and the ring gear, the second element being the other of the sun gear and the ring gear, and the third element being the carrier, and wherein the deceleration device is constructed to have a speed reduction ratio close to a value p and is located between the first motor or the second motor and the ring gear, where p represents a gear ratio of the power distribution integration mechanism given as a ratio of number of teeth of the sun gear to number of teeth of the ring gear.

12. The power output apparatus in accordance with claim 10, wherein the power distribution integration mechanism is a double-pinion planetary gear mechanism including a sun gear, a ring gear, and a carrier arranged to hold at least one set of two pinion gears engaging with each other and respectively engaging with the sun gear and with the ring gear, the first element being one of the sun gear and the carrier, the second element being the other of the sun gear and the carrier, and the third element being the ring gear.

13. A hybrid vehicle including drive wheels driven by power from a driveshaft, the hybrid vehicle comprising:
an internal combustion engine;
a first motor constructed to input and output power;
a second motor constructed to input and output power;
a power distribution integration mechanism configured to have a first element connecting with a rotating shaft of the first motor, a second element connecting with a rotating shaft of the second motor, and a third element connecting with an engine shaft of the internal combustion engine and arranged to allow mutually differential rotations of the three elements; and
a speed change-transmission assembly constructed to include a transmission shaft, a first connection device arranged to selectively connect the first element and the second element of the power distribution integration mechanism to the transmission shaft, a speed change mechanism having an output element and an input element connected to the transmission shaft and configured to change speed of power from the transmission shaft at a preset speed ratio and output the power of the changed speed from the output element, and a second connection device arranged to selectively connect the output element of the speed change mechanism and at least one of the first element and the second element of the power distribution integration mechanism to the driveshaft.

* * * * *